(12) United States Patent
Hayakawa

(10) Patent No.: US 7,471,475 B2
(45) Date of Patent: Dec. 30, 2008

(54) OPTICAL APPARATUS

(75) Inventor: Makoto Hayakawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/858,033

(22) Filed: Sep. 19, 2007

(65) Prior Publication Data

US 2008/0074765 A1    Mar. 27, 2008

(30) Foreign Application Priority Data

Sep. 21, 2006   (JP) ................. 2006-255469

(51) Int. Cl.
*G02B 7/02* (2006.01)
(52) U.S. Cl. ...................... 359/824; 359/823
(58) Field of Classification Search ......... 359/694–703, 359/819–824
See application file for complete search history.

(56) References Cited

U.S. PATENT DOCUMENTS 5,052,781 A  * 10/1991  Iizuka .................. 359/823
5,453,807 A  *  9/1995  Iizuka .................. 396/133

FOREIGN PATENT DOCUMENTS

JP       10-90584       4/1998

* cited by examiner

Primary Examiner—Mohammed Hasan
(74) Attorney, Agent, or Firm—Canon USA Inc I P Div

(57) ABSTRACT

An optical apparatus includes a photographic lens and a vibratory actuator configured to move the photographic lens. The vibratory actuator includes a vibration member having an electro-mechanical energy conversion function for generating vibration and a contact member contacting the vibration member. At least one press-contact surface of the vibration member and the contact member is configured into an arc shape having a central axis corresponding to a moving direction of the photographic lens.

2 Claims, 26 Drawing Sheets

OPTICAL APPARATUS

BACKGROUND OF THE INVENTION

1. Field of the Invention

The present invention relates to an optical apparatus that includes an actuator configured to drive a photographic lens in an optical-axis direction. More specifically, the present invention relates to a vibratory (vibration-type) linear actuator.

2. Description of the Related Art

An optical apparatus discussed in Japanese Patent Application Laid-Open No. 10-90584 includes a vibratory linear actuator as a driving source of a lens.

The vibratory linear actuator discussed in Japanese Patent Application Laid-Open No. 10-90584 includes a vibration member and a contact member. The vibration member has an electro-mechanical energy conversion function for generating vibration according to an electric signal. The contact member contacts the vibration member.

The vibration member is fixed to a lens-holding member, while the contact member is fixed to a stationary member of a lens barrel. When the vibration member generates the driving vibration, the vibration member and the lens-holding member move together.

Alternatively, the contact member is fixed to the lens-holding member and the vibration member is fixed to a stationary member of the lens barrel. When the vibration member generates the driving vibration, the contact member and the lens-holding member move together.

FIGS. 24A to 24D illustrate exemplary vibratory linear actuators discussed in Japanese Patent Application Laid-open No. 10-90584. The vibratory linear actuators include a lens-holding frame 1 that holds a lens, and a guide bar 2 that guides the lens-holding frame 1 in an optical-axis direction.

A support member 3 supports a vibration member 4. A contact member 5 and the vibration member 4 are in a press-contact state. A resilient member 6 generates a pressing force for bringing the vibration member 4 into contact with the contact member 5.

A lens barrel illustrated in FIG. 25 includes a lens-holding frame 11 that holds a lens. A guide bush 12, attached to the lens-holding frame 11, can move in the optical-axis direction along a guide bar 13. A vibrator-supporting frame 14 is provided on the guide bush 12. A pair of support members 15a and 15b supports a vibration member 16.

A contact member 17 is fixed to a lens-barrel body 18. A spring 19 resiliently presses the vibration member 16 to the contact member 17.

According to the examples of FIGS. 24A and 24B, only the resilient member 6 supports the vibration member 4 or the contact member 5, although the vibration member 4 and the contact member 5 are kept in a press-contact state. No member supports the vibration member 4 or the contact member 5 in the optical-axis direction. In a lens driving operation, the resilient member 6 may deform in a driving direction and positioning of the lens-holding frame 1 may not be accurate.

According to the examples of FIGS. 24C and 24D, the support member 3 holds the vibration member 4 that can move in a direction perpendicular to a press-contact surface. Similarly, according to the example of FIG. 25, the support members 15a and 15b hold the vibration member 16 that can move in a direction perpendicular to a press-contact surface. If the installation of the guide bar (2, 13), the support member (3, 15a, 15b), and the contact member (5, 17) are inadequate, undesirable inclination may generate between these components. The vibration member (4, 16) and the contact member (5, 17) are brought into a point- or line-contact state.

The vibration member and the contact member in such a point- or line-contact state cannot generate a sufficient driving force as expected.

FIG. 26B illustrates a slider 21 in an inclined state relative to a vibrator 22, when seen from the optical-axis direction. A pressure-receiving surface of the slider 21 is a flat surface. L represents a width of the pressure-receiving surface of the slider 21. $\phi$ represents a relative inclination between the pressure-receiving surface of the slider 21 and a pressure-receiving surface of the vibrator 22.

FIG. 26A illustrates the slider 21 and the vibrator 22 respectively in a surface contact state with no relative inclination (i.e., $\phi=0$) wherein the slider 21 has a flat pressure-receiving surface and the vibrator 22 has a flat pressure-receiving surface. The pressing force distributes uniformly. The vibratory linear actuator can operate with performances expected.

Durability of the vibratory linear actuator greatly depends on a press-contact force acting on the pressure-receiving surfaces of the slider 21 and the vibrator 22. As described above, the vibratory linear actuator performs a frictional driving operation using an elliptic motion generated on the pressure-receiving surface of the vibrator 22 and the pressing force acting between the slider 21 and the vibrator 22.

In this frictional driving operation, abrasion may arise on the pressure-receiving surfaces of the slider 21 and the vibrator 22. The abrasion is a factor determining the durability.

If the force acting between the slider 21 and the vibrator 22 is uniform and appropriate, the vibratory actuator can possess sufficient durability.

However, as illustrated in FIG. 26B, there may be relative inclination $\phi$ between the slider 21 and the vibrator 22 in an actual product due to manufacturing differences and assembling errors.

In this case, only one edge of the slider 21 contacts the vibrator 22. A frictional force generated between the slider 21 and the vibrator 22 is insufficient. Performances of the vibratory linear actuator deteriorate significantly.

SUMMARY OF THE INVENTION

The present invention is directed to an optical apparatus that is excellent in durability and compact in size. The present invention can stabilize the pressing force acting between a vibration member and a contact member of a vibratory actuator, and can realize a stable lens driving operation.

According to one aspect of the present invention, an optical apparatus includes a photographic lens and a vibratory actuator configured to move the photographic lens. The vibratory actuator includes a vibration member configured to electro-mechanically convert energy to generate vibrations and a contact member contacting the vibration member. At least one press-contact surface of the vibration member and the contact member has an arc shape having a central axis corresponding to a moving direction of the photographic lens.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

DETAILED DESCRIPTION OF THE EMBODIMENTS

Figure 1:
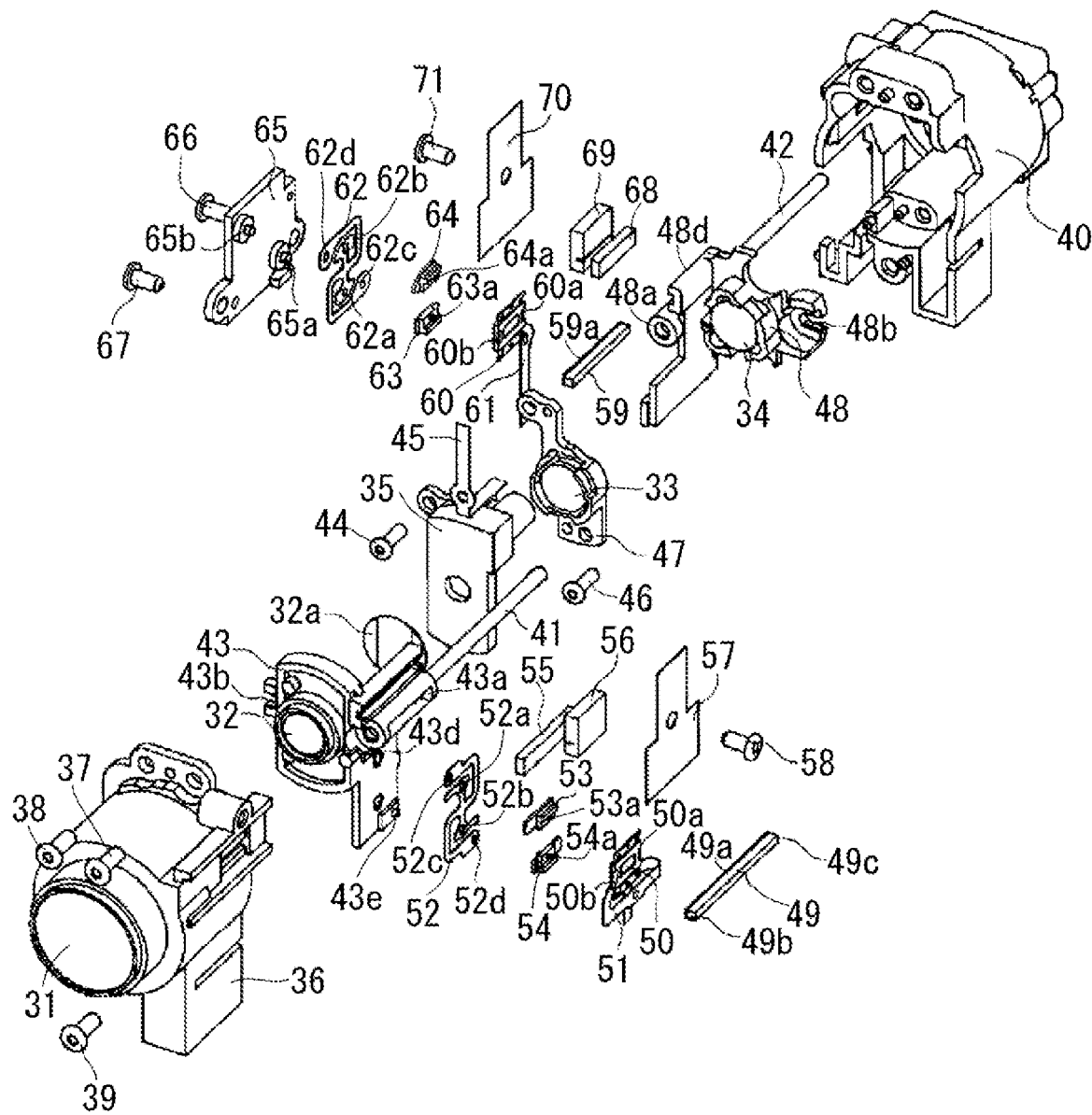
FIG. 1 is an exploded perspective view of a lens barrel according to a first exemplary embodiment of the present invention.
Figure 2:
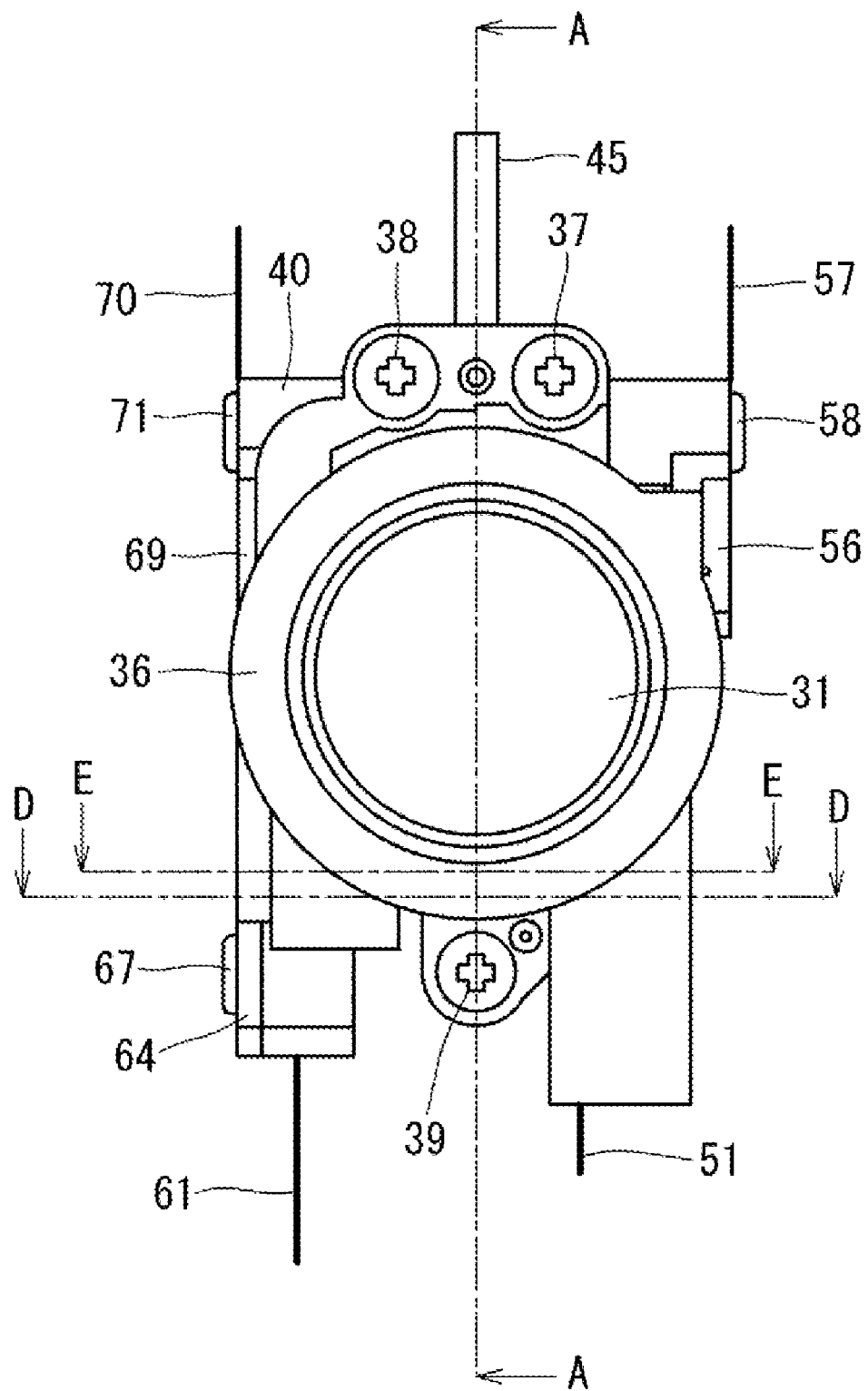
FIG. 2 is a front view of the lens barrel.
Figure 3:
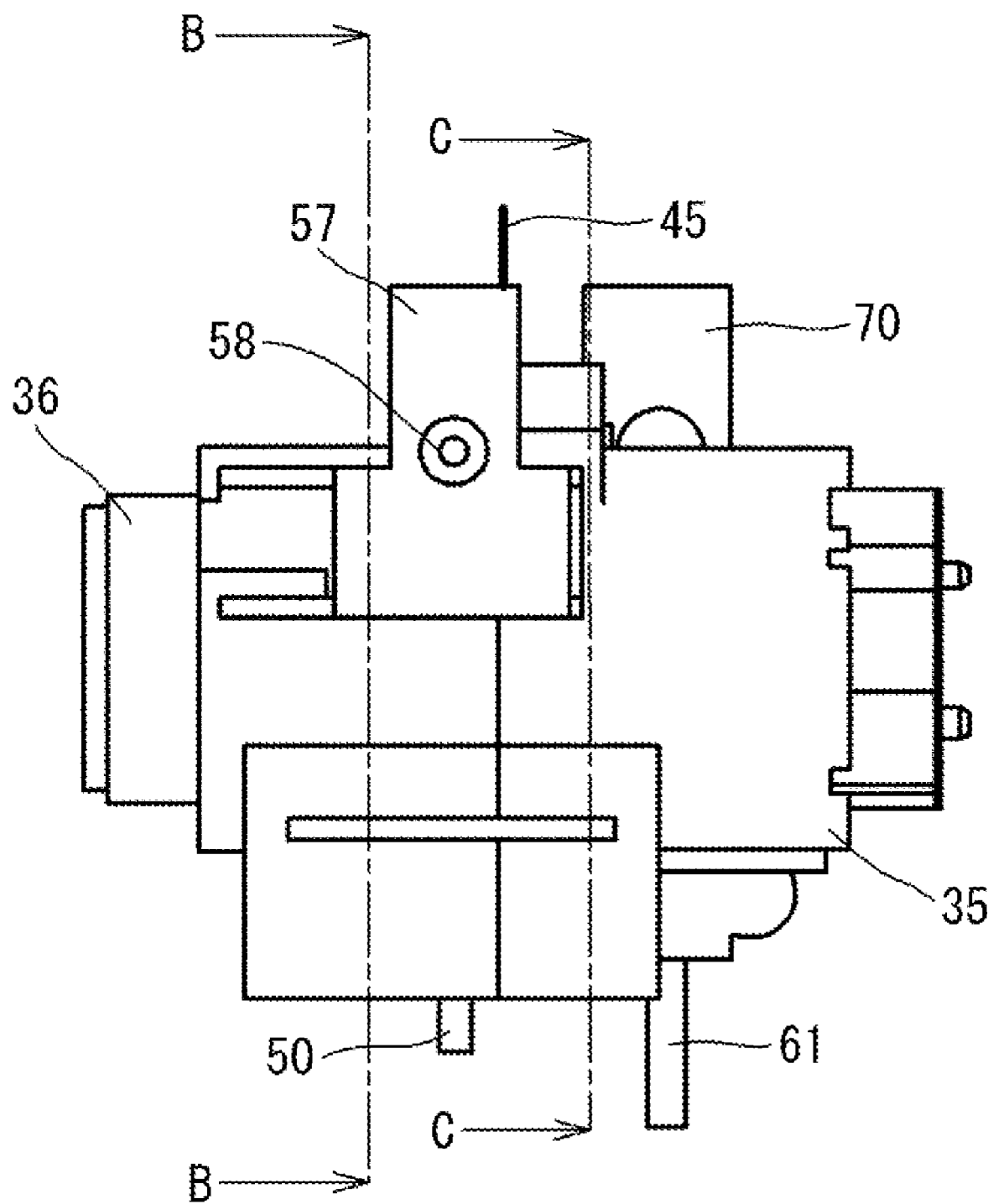
FIG. 3 is a right side view of the lens barrel.

The following description of exemplary embodiments is illustrative in nature and is in no way intended to limit the invention, its application, or uses. It is noted that throughout the specification, similar reference numerals and letters refer to similar items in the following figures, and thus, once an item is described in one figure, it may not be discussed for following figures. Exemplary embodiments will be described in detail below with reference to the drawings.

First Exemplary Embodiment

FIGS. 1 to 8 illustrate a mechanical configuration of a lens barrel according to a first exemplary embodiment of the present invention. The lens barrel includes a first lens unit 31 fixed to a barrel body, a second lens unit 32 movable in an optical-axis direction for a zooming adjustment, a third lens unit 33 fixed to the barrel body, and a fourth lens unit 34 movable in the optical-axis direction for a focal adjustment. The first to fourth lens units 31 to 34 are positioned in order from an object side to an observation side. Each lens unit includes a photographic lens. A light-quantity adjusting unit 35 is interposed between the second lens unit 32 and the third lens unit 33.

A first lens-holding member 36 holds the first lens unit 31. Screws 37, 38, and 39 fix the first lens unit 31 to a rear lens-barrel 40. The rear lens-barrel 40 holds an image sensor and a low-pass filter (LPF). The rear lens-barrel 40 is fixed to a camera body (not illustrated).

Parallel guide bars 41 and 42 extend in the optical-axis direction between the rear lens-barrel 40 and the first lens-holding member 36.

A second lens-holding member 43 holds the second lens unit 32. A mask 32a capable of cutting unnecessary light is fixed to the second lens-holding member 43. The second lens-holding member 43 engages with the guide bar 41 at an engaging portion 43a. The guide bar 41 guides the second lens-holding member 43 in the optical-axis direction. The second lens-holding member 43 engages with the guide bar 42 at an engaging portion 43b. The guide bar 42 prevents the second lens-holding member 43 from rotating around the guide bar 41.

The light-quantity adjusting unit 35 has an outer shape having an up-and-down length longer than a right-and-left length, when seen in the optical-axis direction. A screw 44 fixes the light-quantity adjusting unit 35 to the rear lens-barrel 40. A flexible wiring board 45 is connected to the light-quantity adjusting unit 35. Although not illustrated in detail, the light-quantity adjusting unit 35 includes a guillotine-type diaphragm mechanism that can move a pair of diaphragm blades in parallel with each other in the up-and-down direction with a lever rotated by a stepping motor. The light-quantity adjusting unit 35 can increase and decrease an aperture diameter.

A third lens-holding member 47 holds the third lens unit 33. A screw 46 fixes the third lens-holding member 47 to the rear lens-barrel 40. A fourth lens-holding member 48 holds the fourth lens unit 34. The fourth lens-holding member 48 engages with the guide bar 42 at an engaging portion 48a. The guide bar 42 guides the fourth lens-holding member 48 in the optical-axis direction. The fourth lens-holding member 48 engages with the guide bar 41 at an engaging portion 48b. The guide bar 41 prevents the fourth lens-holding member 48 from rotating around the guide bar 42.

A slider 49 is fixed between the first lens-holding member 36 and the rear lens-barrel 40. The slider 49 includes a magnet and an elastic member integrated together. The slider 49 has a press-contact surface 49a configured into an arc shape and two ends 49b and 49c fixed to the first lens-holding member 36 and the rear lens-barrel 40. A vibrator 50 includes an electro-mechanical energy conversion element and an elastic member. The electro-mechanical energy conversion element generates vibration. The elastic member can be a ferromagnetic plate member. The elastic member of the vibrator 50 and the magnet of the slider 49 magnetically attract each other. The press-contact surface 49*a* of the elastic member constituting the slider 49 is brought into contact with two press-contact surfaces 50*a* and 50*b* of the elastic member constituting the vibrator 50. The press-contact surfaces 50*a* and 50*b* are spaced from each other in the optical-axis direction.

The slider 49 and the vibrator 50 constitute a first vibratory linear actuator. A flexible wiring board 51 supplies two frequency signals (pulse signals or alternating signals) having different phases to the electro-mechanical energy conversion element. The press-contact surfaces 50*a* and 50*b* of the vibrator 50 cause an elliptic motion when actuated according to the frequency signals. A pressing force acting between the slider 49 and the vibrator 50 generates a frictional force. Together with the elliptic motion, the frictional force generates a driving force in the optical-axis direction that acts on the press-contact surface 49*a* of the slider 49.

An adhesive fixes a spring 52*a* of a plate spring 52 to a spacer 53. An adhesive fixes a spring 52*b* of the plate spring 52 to a spacer 54. An adhesive fixes portions 52*c* and 52*d* of the plate spring 52 to portions 43*d* and 43*e* of the second lens-holding member 43. Furthermore, an adhesive fixes the vibrator 50 to the spacers 53 and 54 via positioning pins 53*a* and 54*a*.

An adhesive fixes a scale 55 to a portion 43*d* of the second lens-holding member 43. The scale 55 detects a displacement of the second lens-holding member 43 in the optical-axis direction. A light emitting/receiving element 56 is positioned near the scale 55. The light emitting/receiving element 56 emits light toward the scale 55 and receives light reflected from the scale 55. The light emitting/receiving element 56 detects a displacement of the second lens-holding member 43. The light emitting/receiving element 56 and the scale 55 constitute a first linear encoder that functions as a position detector. The light emitting/receiving element 56 transmits or receives a signal via a flexible wiring board 57. A screw 58 fixes the flexible wiring board 57 to the first lens-holding member 36.

The guide bar 41, the first vibratory linear actuator and the first linear encoder (i.e., the light emitting/receiving element 56 and the scale 55) are positioned near a right side surface of the light-quantity adjusting unit 35, when seen from a front side of the optical-axis direction. The guide bar 41 is interposed between the first vibratory linear actuator and the first linear encoder in the up-and-down direction.

An adhesive fixes a slider 59 to a groove formed on the fourth lens-holding member 48. The slider 59 includes a magnet and an elastic member integrated together. The slider 59 has a press-contact surface 59*a* configured into an arc shape. A vibrator 60 includes an electro-mechanical energy conversion element and an elastic member. The elastic member can be a ferromagnetic plate member. The conversion element vibrates the elastic member. The elastic member of the vibrator 60 and the magnet of the slider 59 magnetically attract each other. The press-contact surface 59*a* of the elastic member constituting the slider 59 is brought into contact with two press-contact surfaces 60*a* and 60*b* of the elastic member constituting the vibrator 60. The press-contact surfaces 60*a* and 60*b* are spaced from each other in the optical-axis direction.

The slider 59 and the vibrator 60 constitute a second vibratory linear actuator. A flexible wiring board 61 supplies two frequency signals (pulse signals or alternating signals) having different phases to the electro-mechanical energy conversion element. The press-contact surfaces 60*a* and 60*b* of the vibrator 60 cause an elliptic motion when actuated according to the frequency signals. A pressing force acting between the slider 59 and the vibrator 60 generates a frictional force. The frictional force generates a driving force in the optical-axis direction that acts on the press-contact surface 59*a* of the slider 59.

An adhesive fixes a portion 62*a* of a plate spring 62 to the vibrator 60 via a positioning pin 63*a* of a spacer 63. An adhesive fixes a portion 62*b* of the plate spring 62 to the vibrator 60 via a positioning pin 64*a* of a spacer 64. Furthermore, stopper screws 66 and 67 fix an actuator cover 65 to the first lens-holding member 36 and the rear lens-barrel 40. An adhesive fixes portions 62*c* and 62*d* of the plate spring 62 to portions 65*a* and 65*b* of the actuator cover 65. The vibrator 60, the spacer 63, the spacer 64, the plate spring 62, and the actuator cover 65 are integrated.

An adhesive fixes a scale 68 to a groove 48*d* of the fourth lens-holding member 48. The scale 68 detects a displacement of the fourth lens-holding member 48. A light emitting/receiving element 69 is positioned near the scale 68. The light emitting/receiving element 69 emits light toward the scale 68 and receives light reflected from the scale 68. The light emitting/receiving element 69 detects a displacement of the fourth lens-holding member 48. The light emitting/receiving element 69 and the scale 68 constitute a second linear encoder that functions as a detector. A screw 71 fixes a flexible wiring board 70 to the rear lens-barrel 40. The light emitting/receiving element 69 transmits or receives a signal via the flexible wiring board 70.

The guide bar 42, the second vibratory linear actuator, and the second linear encoder (i.e., the light emitting/receiving element 69 and the scale 68) are positioned near a left side surface of the light-quantity adjusting unit 35, when seen from the front side of the optical-axis direction. The guide bar 42 is interposed between the second vibratory linear actuator and the second linear encoder in the up-and-down direction.

A first group of the first vibratory linear actuator, the guide bar 41, and the first linear encoder is positioned symmetrically to a second group of the second vibratory linear actuator, the guide bar 42, and second linear encoder, with respect to an axis involving the center of the optical axis and extending in the up-and-down direction.

Figure 4:
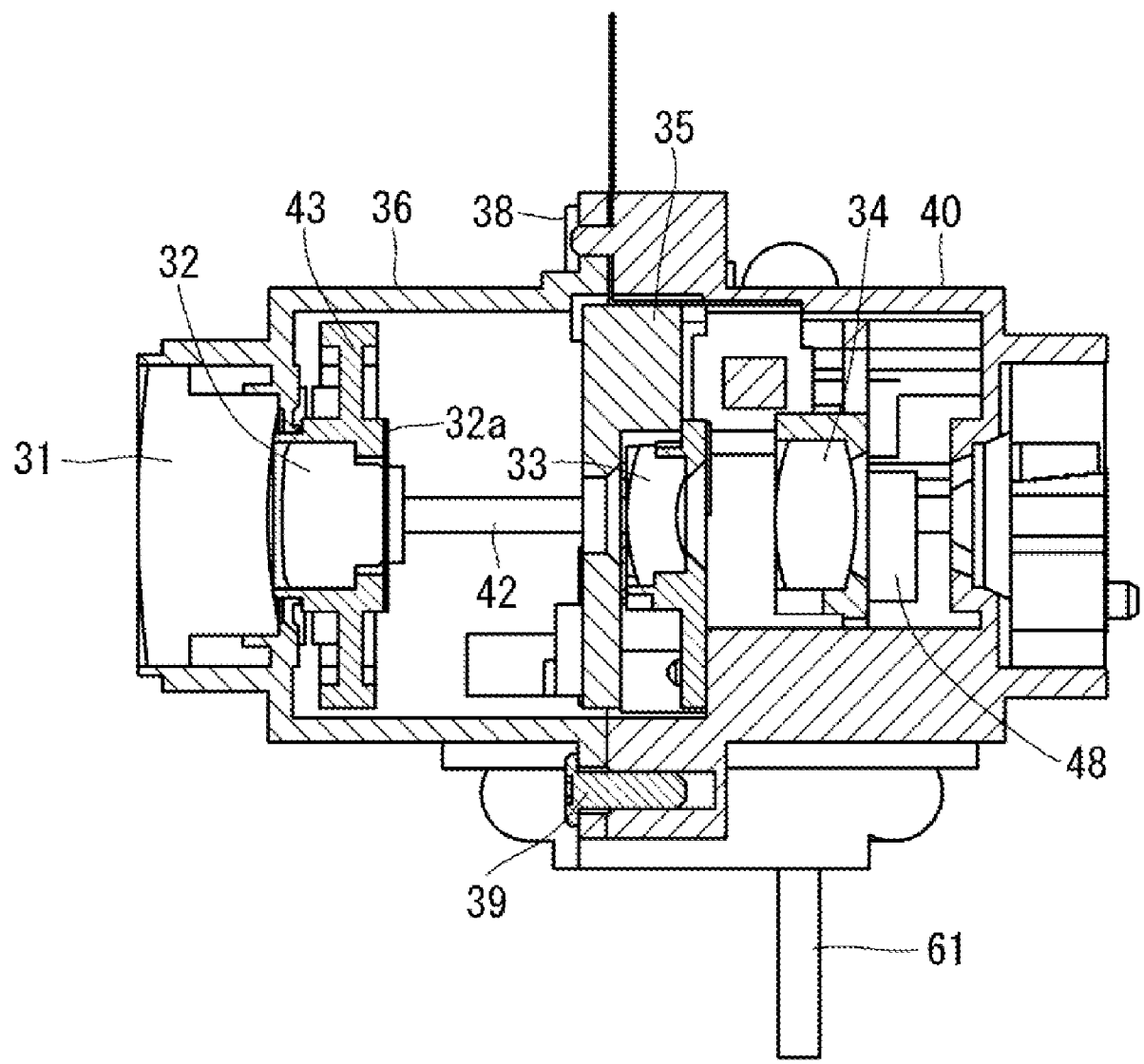
FIG. 4 is a cross-sectional view of the lens barrel taken along a line A-A of FIG. 2.
Figure 5:
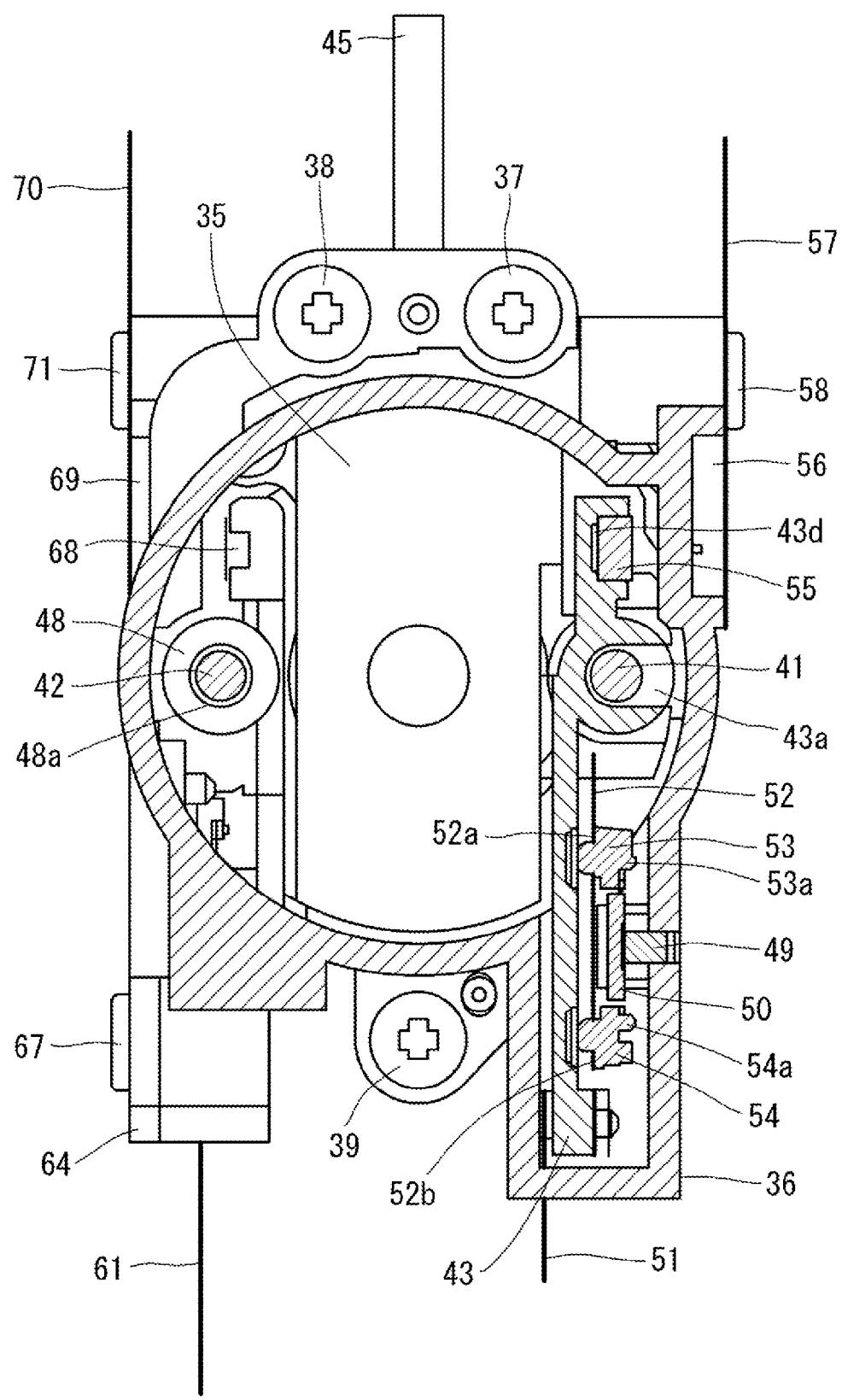
FIG. 5 is an enlarged cross-sectional view of the lens barrel taken along a line B-B of FIG. 3.
Figure 6:
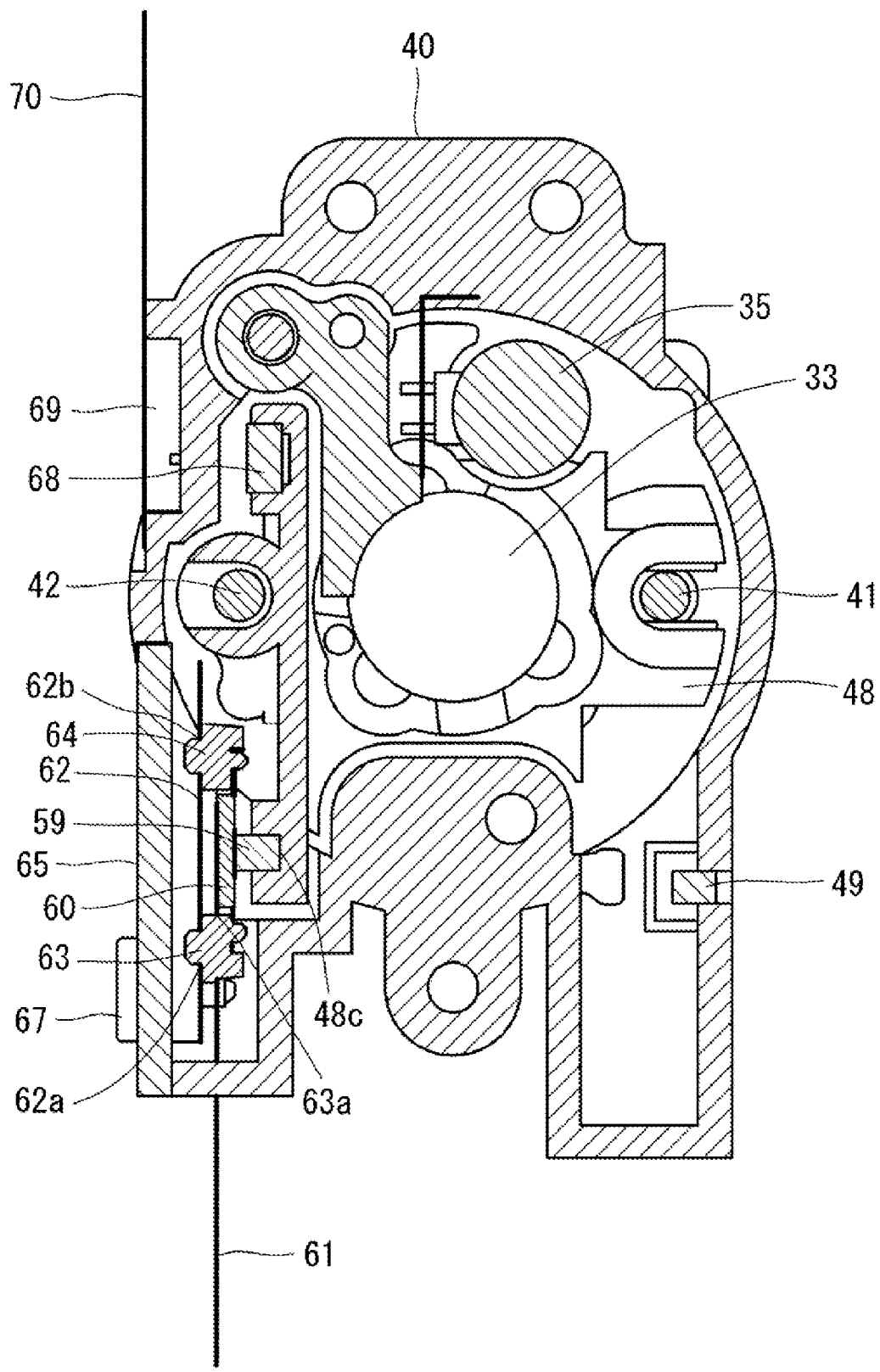
FIG. 6 is an enlarged cross-sectional view of the lens barrel taken along a line C-C of FIG. 3.
Figure 7:
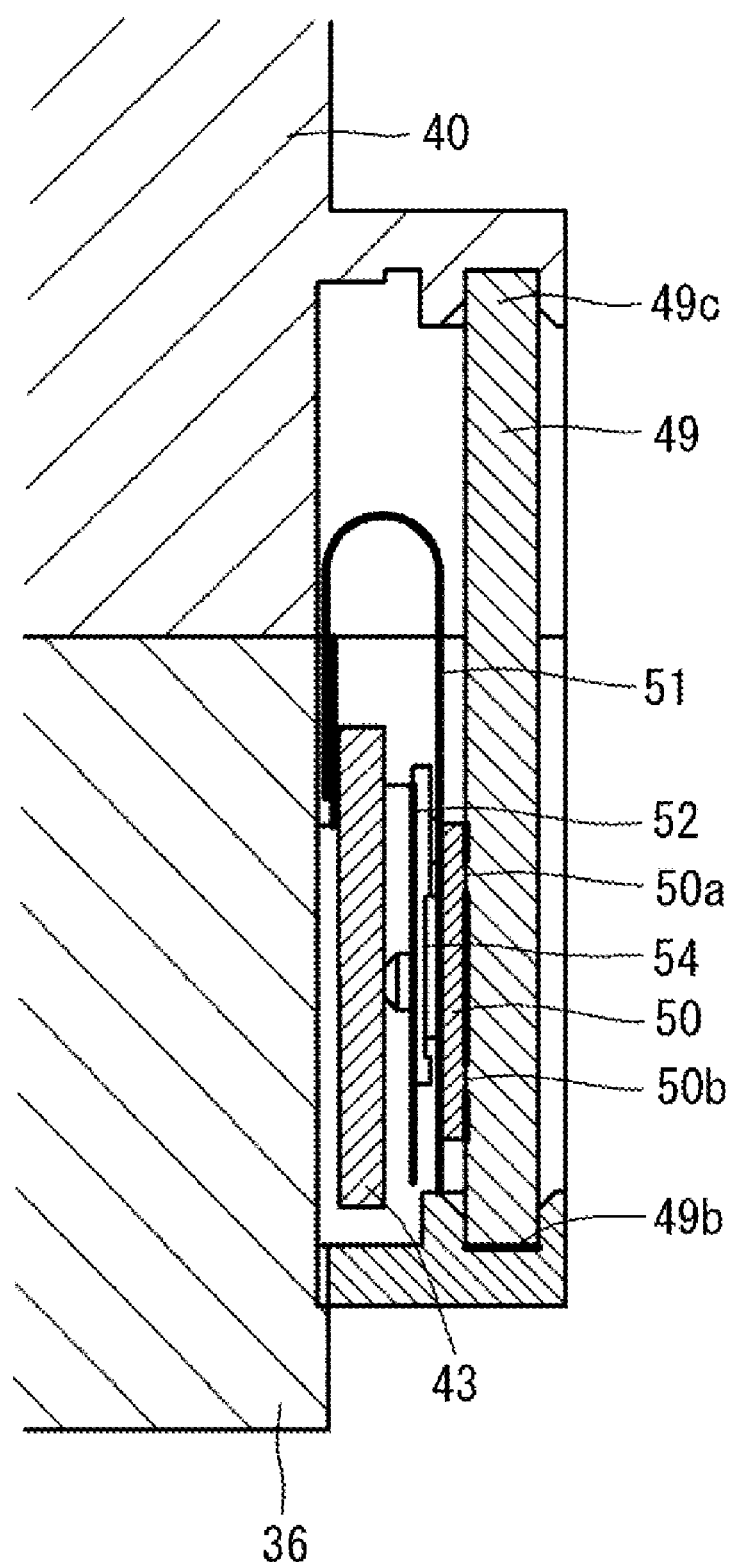
FIG. 7 is a cross-sectional view of the lens barrel taken along a line D-D of FIG. 2.
Figure 8:
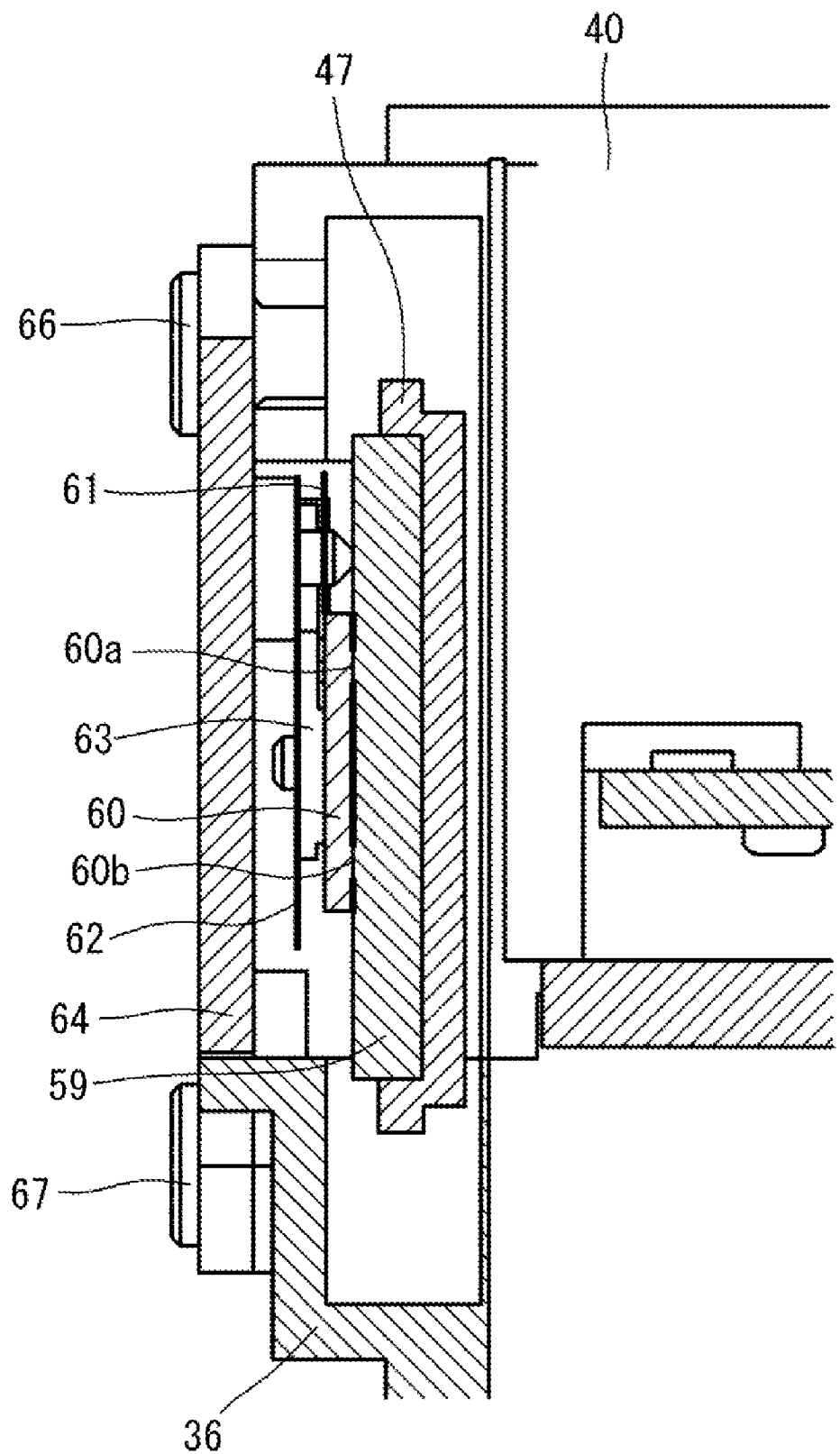
FIG. 8 is a cross-sectional view of the lens barrel taken along a line E-E of FIG. 2.

As apparent from FIG. 4, a movable range of the second lens-holding member 43 extends from an object side to an imaging-plane side in the optical-axis direction. The object is on the left side of the light-quantity adjusting unit 35, and the imaging-plane is on the right side. A movable range of the fourth lens-holding member 48 extends, in the optical-axis direction, from an imaging-plane side to an inner position of the light-quantity adjusting unit 35. Namely, the movable range of the second lens-holding member 43 and the movable range of the fourth lens-holding member 48 are partly overlapped in the optical-axis direction. The movable range of the second lens-holding member 43 is wider than the movable range of the fourth lens-holding member 48.

Similarly, an installation range of the first vibratory linear actuator in the optical-axis direction (i.e., a longitudinal range of the slider 49) and an installation range of the second vibratory linear actuator (i.e., a longitudinal range of the slider 59) are mutually overlapped in the optical-axis direction.

Figure 9:
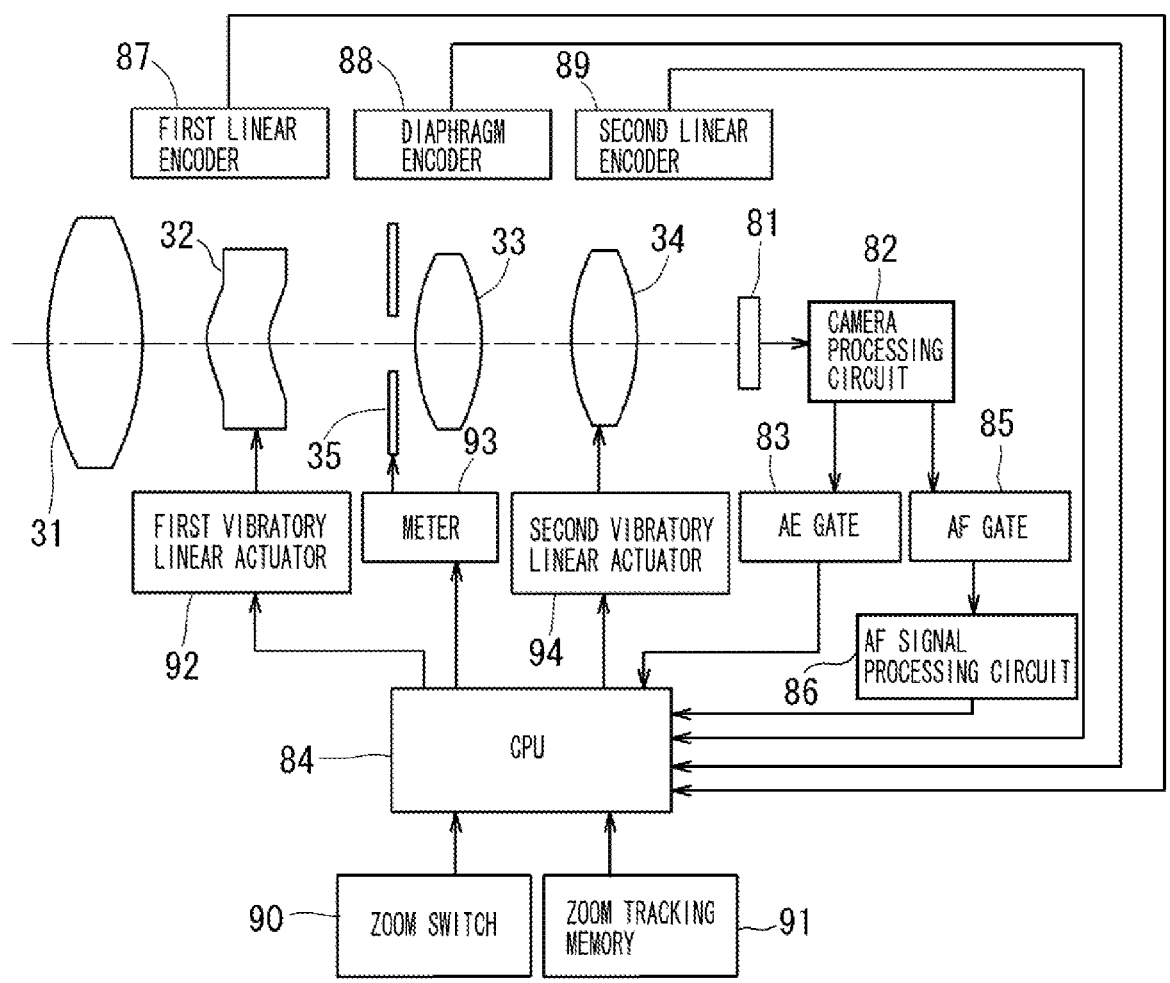
FIG. 9 illustrates a block circuit arrangement of an imaging apparatus.

FIG. 9 illustrates a block circuit arrangement of an imaging apparatus. An image sensor 81, provided in the rear lens-barrel 40, includes a charge-coupled device (CCD) sensor or a metal oxide semiconductor (MOS) sensor. The installation position of the image sensor 81 is a rear end of the common optical axis of the first lens unit 31 through the fourth lens unit 34. A camera processing circuit 82 receives an output signal of the image sensor 81. The camera processing circuit 82 supplies an output signal to a central processing unit (CPU) 84 via an auto-exposure (AE) gate 83 and supplies another output signal to the CPU 84 via an auto-focus (AF) gate 85 and an AF signal processing circuit 86.

A first linear encoder 87 detects a present position of the second lens unit 32. A diaphragm encoder 88 detects an aperture value of the light-quantity adjusting unit 35. A second linear encoder 89 detects a present position of the fourth lens unit 34. The CPU 84 receives output signals from the first linear encoder 87, the diaphragm encoder 88, and the second linear encoder 89. The CPU 84 is associated with a zoom switch 90 and a zoom tracking memory 91.

The CPU 84 supplies an output signal to the second lens-holding member 43 via the first vibratory linear actuator 92 that includes the slider 49 and the vibrator 50. Furthermore, the CPU 84 supplies an output signal to the light-quantity adjusting unit 35 via a meter 93. The CPU 84 supplies an output signal to the fourth lens-holding member 48 via the second vibratory linear actuator 94 that includes the slider 59 and the vibrator 60.

The CPU 84 is a control circuit configured to control an operation of the imaging apparatus. The camera processing circuit 82 applies specific processing (e.g., amplification and gamma correction) to the output signal of the image sensor 81 and generates contrast signals of the video signal that pass through the AE gate 83 and the AF gate 85. The AE gate 83 and the AF gate 85 can set optimum signal extraction ranges for exposure determination and focus adjustment in the entire screen. Both the gates 83 and 85 are variable in size. Each of the gates 83 and 85 may include a plurality of gates. The AF signal processing circuit 86 extracts a high-frequency component from the video signal and generates an AF evaluation value signal.

The zoom switch 90 enables a user to perform a zooming operation. The zoom tracking memory 91 stores target position information that indicates a target position of the fourth lens unit 34 driven to maintain an in-focus state during a zooming operation. The target position of the fourth lens unit 34 is determined based on the distance of a target and the position of the second lens unit 32. The zoom tracking memory 91 may be a built-in memory for the CPU 84.

The meter 93 is a driving source of the light-quantity adjusting unit 35. The first linear encoder 87 includes the scale 55 and the light emitting/receiving element 56. The second linear encoder 89 includes the scale 68 and the light emitting/receiving element 69. The linear encoder 87 detects a relative position (i.e., a displacement from a reference position) of the second lens unit 32 in the optical-axis direction. Similarly, the linear encoder 89 detects a relative position of the fourth lens unit 34 in the optical-axis direction.

The linear encoders 87 and 89 are not limited to optical encoders and may be magnetic encoders. Alternatively, the linear encoders 87 and 89 may be other encoders capable of detecting an absolute position based on an electric resistance value. The diaphragm encoder 88 may include a Hall element provided inside the meter 93 that detects a relationship in rotational position between a rotor and a stator of the meter 93.

According to the above-described arrangement, if a user (i.e., a photographer) operates the zoom switch 90, the CPU 84 controls the first vibratory linear actuator 92 that drives the second lens unit 32. The CPU 84 calculates a target driving position of the fourth lens unit 34 with reference to the information stored in the first zoom tracking memory 91 and the present position of the second lens unit 32 obtained from the detection result of the first linear encoder 87.

Then, the CPU 84 controls the second vibratory linear actuator 94 that moves the fourth lens unit 34 to the target driving position. The CPU 84 determines whether the fourth lens unit 34 has reached the target driving position. If the present position of the fourth lens unit 34 obtained from the detection result of the second linear encoder 89 and the target driving position are the same, the CPU 84 determines that the fourth lens unit 34 has reached the target driving position.

In an auto-focus operation, the CPU 84 controls the second vibratory linear actuator 94 that drives the fourth lens unit 34 to a position where an AF evaluation value obtained by the AF signal processing circuit 86 is maximized.

In order to obtain an appropriate exposure, the CPU 84 controls the meter 93 of the light-quantity adjusting unit 35 that controls an aperture diameter. The exposure can be optimized when an average value of the luminance signal having passed through the AE gate 83 becomes a specific value, i.e., when an output signal of the diaphragm encoder 88 becomes a value corresponding to the specific value.

Figure 10:
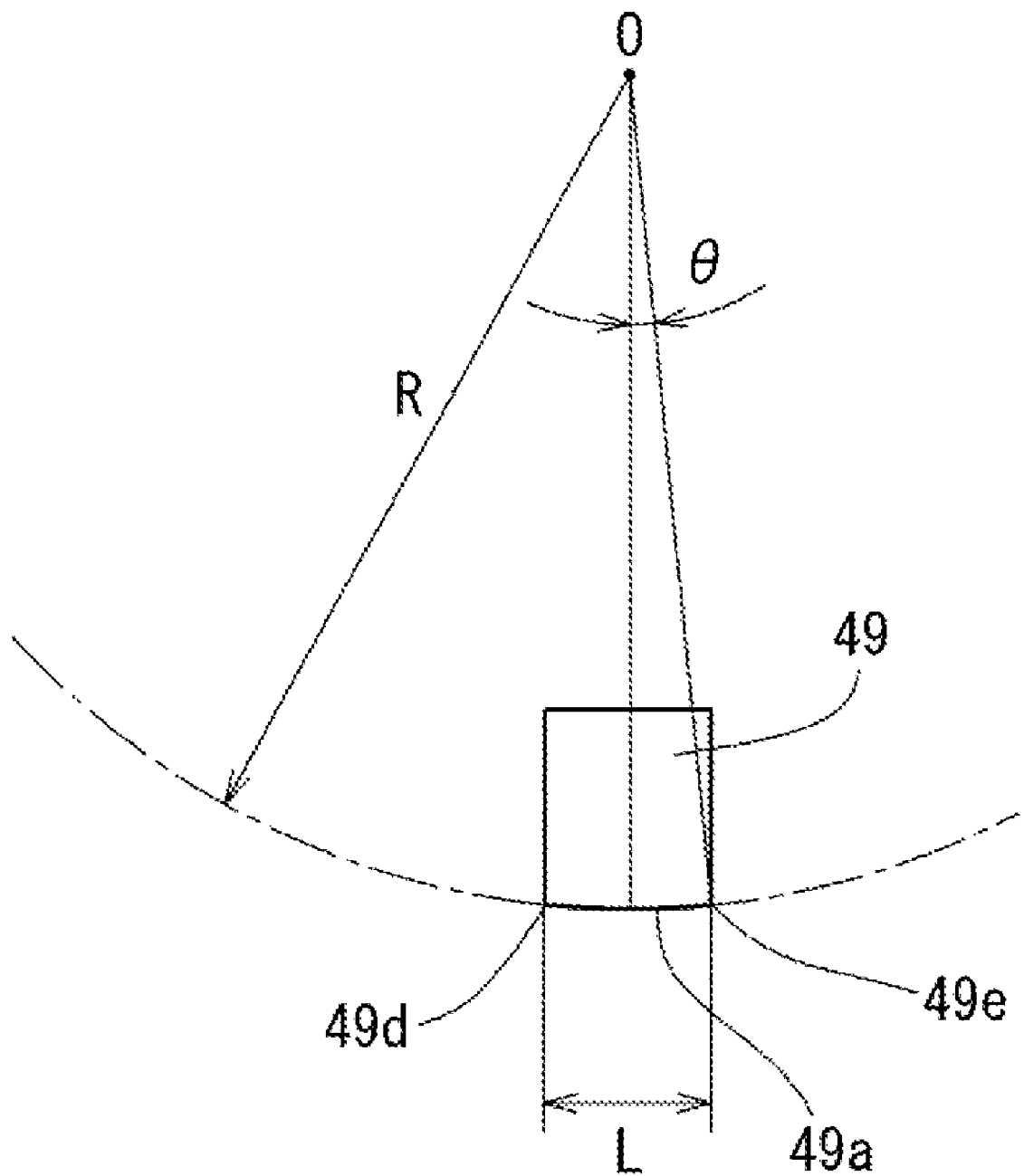
FIG. 10 illustrates a slider seen from an optical-axis direction.
Figure 11A:
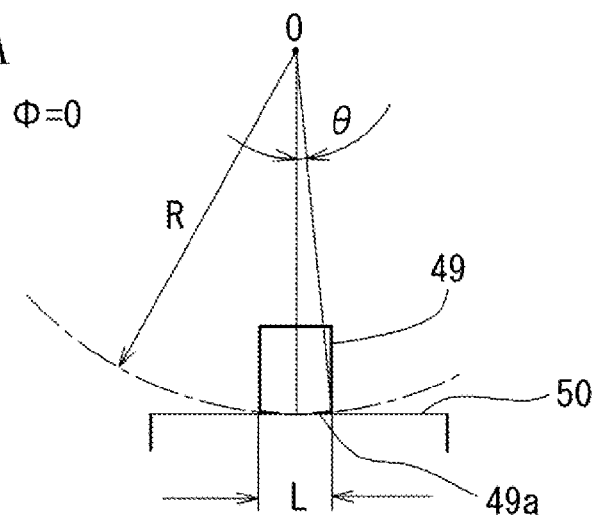
FIGS. 11A to 11C illustrate a relationship between the slider and a vibrator seen from the optical-axis direction.
Figure 11B:
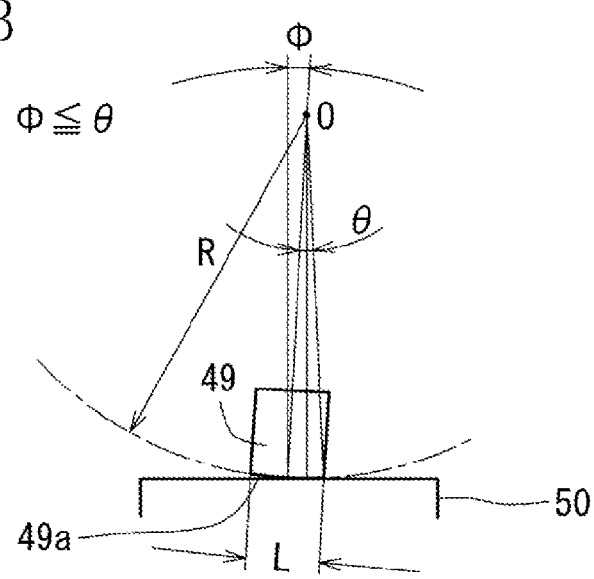
Figure 11C:
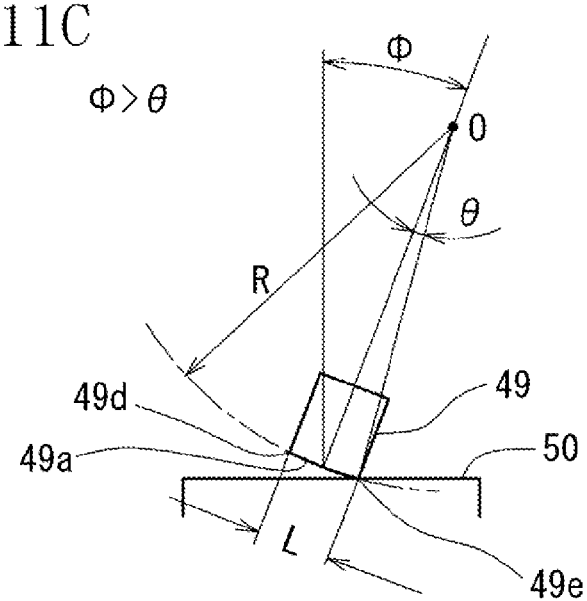

FIG. 10 illustrates the slider 49 having the pressure-contact surface 49*a* configured into an arc shape when seen from the optical-axis direction. FIGS. 11A to 11C illustrate an angular change in the relationship between the slider 49 and the vibrator 50 seen from the optical-axis direction. "L" represents a width of the press-contact surface 49*a*, i.e., a press-contact portion, defined on a surface of the vibrator 50 perpendicular to an optical axis of the photographic lens. The press-contact surface 49*a* has two edges 49*d* and 49*e*.

"R" represents a radius of curvature of an arc defining the press-contact surface 49*a* of the slider 49. "O" represents a center of the arc. The angle θ is an angle formed between a line segment connecting the center O of the arc shape to a midpoint of the press-contact surface 49*a* and a line segment connecting the center O of the arc shape to the edge 49*e*. The parameters R, L, and θ satisfy a relationship of $2R/L = \sin\theta$.

In FIGS. 11A to 11C, φ represents an inclination of the slider 49 relative to the vibrator 50, which may be caused by manufacturing errors. The angle (φ can be defined as an angle formed between the line segment connecting the center O of the arc shape to the midpoint of the press-contact surface 49*a* and a perpendicular line extending from the midpoint of the press-contact surface 49*a*.

According to an example illustrated in FIG. 1A (i.e., φ=0), the slider 49 contacts the vibrator 50 at the midpoint of the press-contact surface 49*a*. According to an example illustrated in FIG. 11B (i.e., φ≦θ), the slider 49 contacts the vibrator 50 at a position offset by an amount corresponding to the angle φ from the midpoint of the press-contact surface 49*a*. The contact points in the examples of FIGS. 11A and 11B are both positioned on the arc surface.

According to an example illustrated in FIG. 11C (i.e., φ>θ), the slider 49 contacts the vibrator 50 at the edge 49*e*. In this state, the frictional force acting between the slider 49 and the vibrator 50 is insufficient. An insufficient frictional force causes the driving performance and the durability of the first vibratory linear actuator 92 to deteriorate.

According to two states illustrated in FIGS. 11A and 11B, the arc portion of the slider 49 contacts the flat surface of the vibrator 50. Because the slider 49 and the vibrator 50 are both elastic, the contact between the slider 49 and the vibrator 50 is a surface contact (not a line contact). Accordingly, the first vibratory linear actuator 92 can operate adequately if the slider 49 and the vibrator 50 are in the state illustrated in FIG. 11A (φ=0) or 11B (φ≦θ). A large contact area, obtained when the radius R is large, can improve the driving characteristics and the durability.

On the contrary, if the slider 49 has a cylindrical body, the radius R of the slider 49 may be small (in other words, the curvature may be large) because of restrictions to the width of slider 49. The driving characteristics and the durability deteriorate. Accordingly, it is useful to set a radius of curvature R as large as possible within a possible inclination range of the slider 49.

According to present exemplary embodiment, the magnet generates the pressing force acting between the slider 49 and the press-contact portion of the vibrator 50. In such a case, if the radius of curvature R is large, the clearance between the slider 49 and the vibrator 50 becomes large at both edges 49d and 49e so that the pressing force decreases. In this respect, it is useful to set the radius of curvature R as large as possible.

Figure 12:
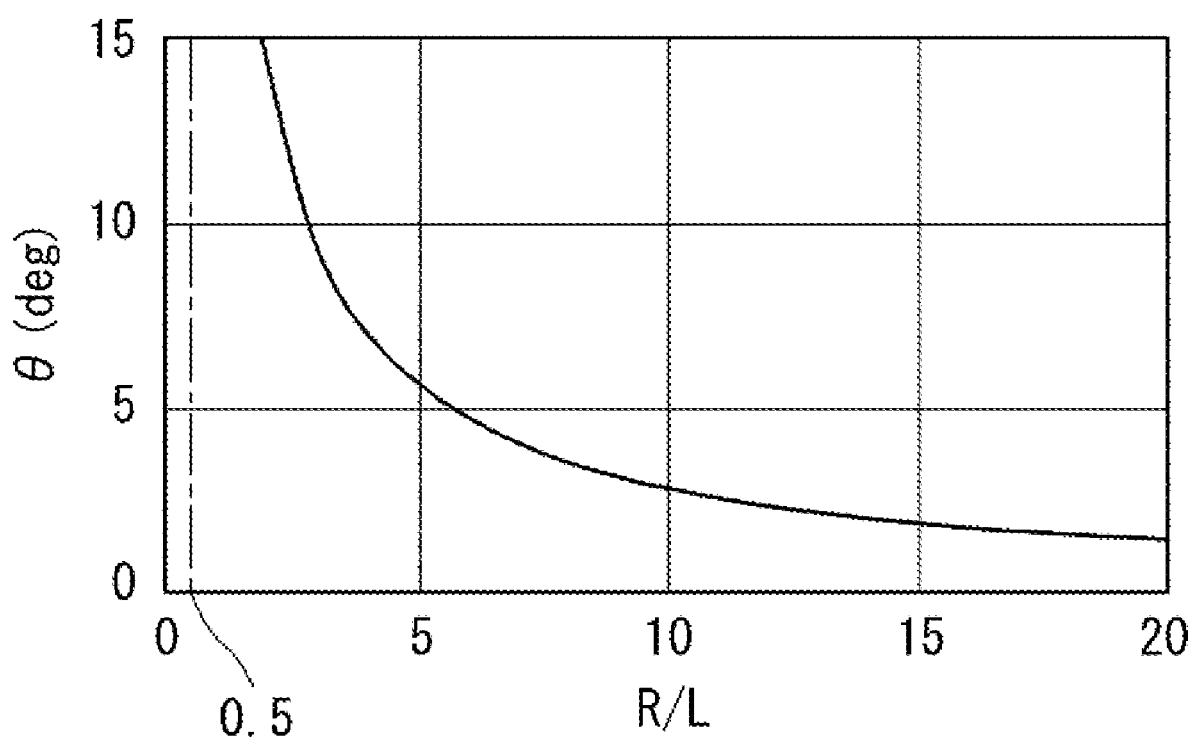
FIG. 12 is a graph illustrating a relationship between angle θ and ratio R/L.

FIG. 12 is a graph illustrating a relationship between angle θ and ratio R/L, where R represents the radius of curvature and L represents the width of the pressure-receiving surface of the slider 21. Manufacturing errors and/or assembling errors may cause a relative inclination between the vibrator 50 and the slider 49, in a range from 0.0 to 2.5 degrees. A setting of the angle θ for maintaining a sufficient contact on the arc surface of the slider 49 is more than a possible inclination of the slider 49. Accordingly, a setting of the ratio R/L satisfies a relationship that the angle θ is equal to or larger than 2.5 degrees. When the ratio is 10 (R/L=10), the angle θ is 2.87 degrees. The ratio R/L should satisfy a relationship R/L≦10. The width L does not exceed two times the radius of curvature R. Therefore, a lower limit of R/L is 0.5.

The description with reference to FIGS. 10 to 12 can be equally applied to the second vibratory linear actuator 94 including the slider 59 and the vibrator 60.

Figure 13A:
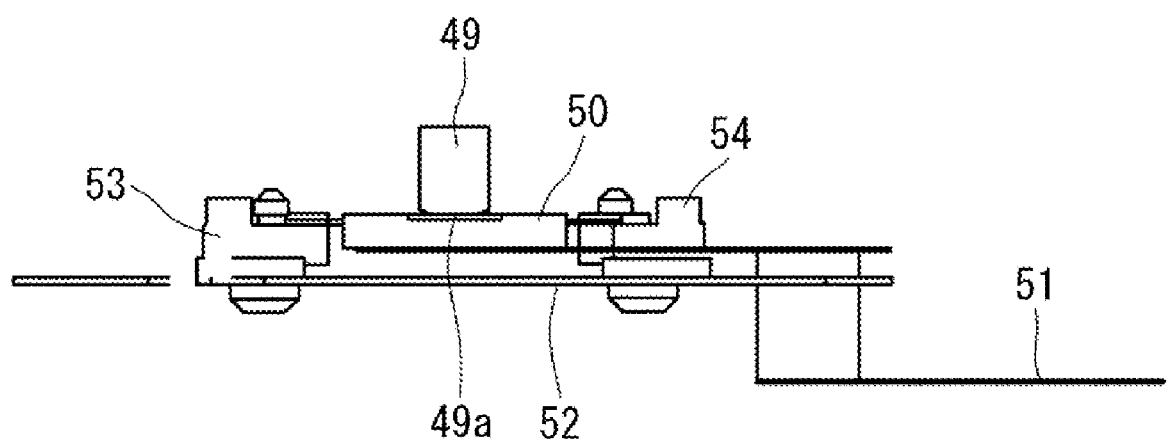
FIGS. 13A and 13B illustrate a first vibratory linear actuator.
Figure 13B:
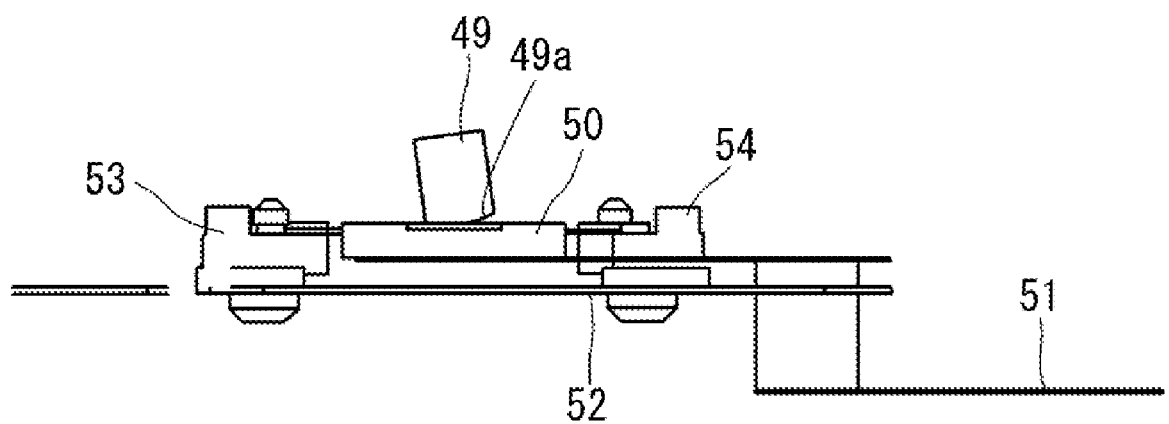

According to the above-described arrangement, manufacturing errors may cause an inclination of a press-contact surface of the slider 49 or the vibrator 50 relative to an axis parallel to the optical axis as illustrated in FIGS. 13A and 13B. In such a case, because the press-contact surface 49a of the slider 49 has an arc shape, the contact state between the slider 49 and the vibrator 50 does not change so that the performance does not deteriorate. If any deviation occurs in the direction of the press-contact surface 49a, the plate spring 52 deforms and adjusts a press-contact position.

If an angular deviation occurs around an axis parallel to the press-contact surface 49a and perpendicular to the optical axis, the plate spring 52 rotates around the axis to maintain the press-contact state adequately at two press-contact surfaces 50a and 50b of the vibrator 50 separated in the longitudinal direction. A resilient force generated by the deformation of the plate spring 52 is small compared to the pressing force applied between the slider 49 and the vibrator 50. The pressing force acting between the press-contact surfaces 50a and 50b does not change substantially. The first vibratory linear actuator 92 can operate stably with performances expected.

The magnet of the slider 49 magnetically attracts the vibrator 50 and generates the pressing force for generating the driving force of the first vibratory linear actuator 92. Therefore, a reaction force of the pressing force does not act on the second lens-holding member 43. No large frictional force is generated at the engaging portions 43a and 43b of the second lens-holding member 43 where the second lens-holding member 43 engages with the guide bars 41 and 42. The driving load does not increase due to the friction. Accordingly, the first vibratory linear actuator 92 can be configured as a low-output and compact type. The present exemplary embodiment can downsize the lens barrel.

Furthermore, the present exemplary embodiment can accurately realize a minute driving operation for the second lens-holding member 43 of the second lens unit 32.

Similarly, the magnet of the slider 59 magnetically attracts the vibrator 60 and generates the pressing force for generating the driving force of the second vibratory linear actuator 94. Therefore, a reaction force of the pressing force does not act on the fourth lens-holding member 48. No large frictional force is generated at the engaging portions 48a and 48b of the fourth lens-holding member 48 where the fourth lens-holding member 48 engages with the guide bars 41 and 42. The driving load (abrasion) does not increase due to the friction. A minute driving operation for the fourth lens-holding member 48 of the fourth lens unit 34 can be accurately realized. The second vibratory linear actuator 94 can be configured as a low-output and compact type. The present exemplary embodiment can downsize the lens barrel.

Figure 14A:
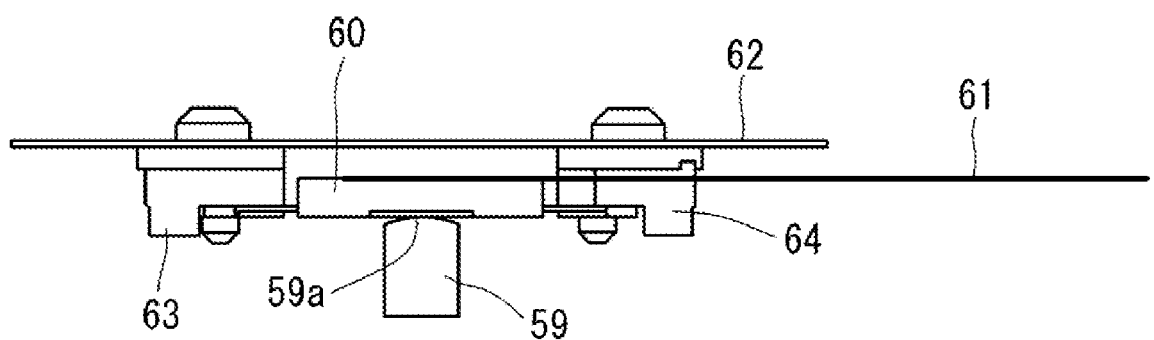
FIGS. 14A and 14B illustrate a second vibratory linear actuator.
Figure 14B:
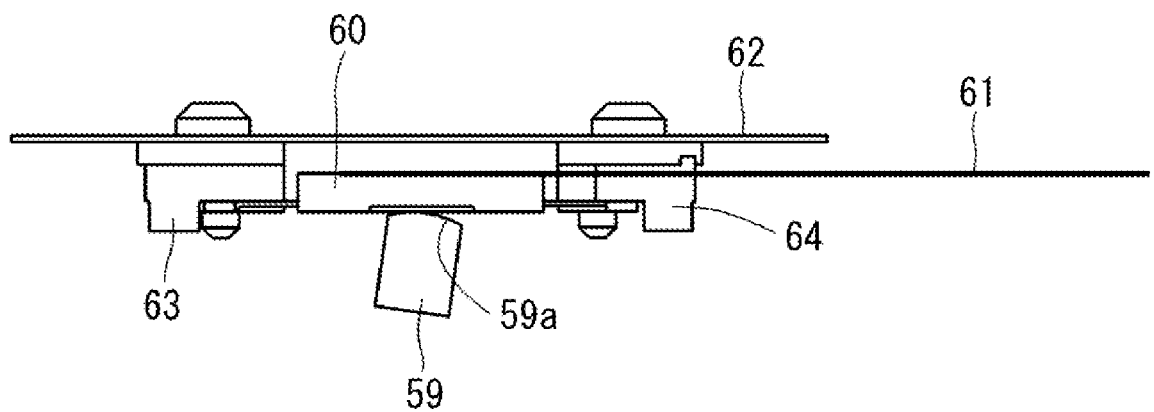

The contact between the slider 59 and the vibrator 60 may change from a state illustrated in FIG. 14A to a state illustrated in FIG. 14B when an angular deviation around an axis parallel to the optical axis occurs due to manufacturing errors. In such a case, because the press-contact surface 59a of the slider 59 is configured into an arc shape, the substantial contact state remains unchanged between the slider 59 and the vibrator 60 although the contact point of the slider 59 is different. Thus, the performance of the second vibratory linear actuator 94 does not deteriorate.

If the slider 59 or the vibrator 60 has any deviation in a direction perpendicular to the press-contact surface 59a, the plate spring 62 deforms and maintains the slider 59 and the vibrator 60 in an adequate press-contact state.

Similarly, if an angular deviation around an axis perpendicular to the optical axis and parallel to the press-contact surface occurs between the slider 59 and the vibrator 60, the plate spring 62 twists around the axis and maintains the press-contact state adequately. In this case, the deformation of the plate spring 62 does not generate a large reaction force because the plate spring 52 is long enough in the longitudinal direction. No large change occurs in the pressing force applied to the press-contact surface 59a. The second vibratory linear actuator 94 can operate stably with performances expected.

As described above, according to the present exemplary embodiment, the guide bar 41, the first vibratory linear actuator 92, and the first linear encoder 87 are positioned along the right side surface of the light-quantity adjusting unit 35 when seen from the optical-axis direction. The guide bar 41 is interposed between the first vibratory linear actuator 92 and the first linear encoder 87 in the up-and-down direction. The guide bar 42, the second vibratory linear actuator 94, and the second linear encoder 89 are positioned along the left side surface of the light-quantity adjusting unit 35 when seen from the optical-axis direction. The guide bar 42 is interposed between the second vibratory linear actuator 94 and the second linear encoder 89 in the up-and-down direction.

Accordingly, the present exemplary embodiment can realize a compact lens barrel capable of accommodating the light-quantity adjusting unit 35, two vibratory linear actuators 92 and 94 driving the two lens-holding members 43 and 48, two guide bars 41 and 42, and two linear encoders 87 and 89.

The sliders 49 and 59, positioned near the guide bars 41 and 42, can smoothly drive the second and fourth lens-holding members 43 and 48. The scales 55 and 68, positioned near the guide bars 41 and 42, can accurately detect the positions of the second lens-holding member 43 and the fourth lens-holding member 48. The scales 55 and 68 do not cause large displacements even when the engaging portions (43a, 43b, 48a, 48b) of the second and fourth lens-holding members 43 and 48 are loose.

The vibratory linear actuator and the linear encoder may be positioned at opposite sides of the optical axis with respect to the guide bar that guides the lens-holding member (i.e., a driving object and a position detection object). In this case, if the lens-holding member engages loosely with the guide bar, the linear encoder may swing about the guide bar (serving as a fulcrum) in the beginning of the driving operation and may move toward a direction opposed to the driving direction so that the position detection of the linear encoder becomes inaccurate. However, such a problem does not arise in the present exemplary embodiment because the vibratory linear actuator (92, 94) and the linear encoder (87, 89) are positioned on the same side as the guide bar that guides the lens-holding member (43, 48).

In the present exemplary embodiment, the first vibratory linear actuator 92 includes the vibrator 50 provided on the second lens-holding member 43 and the slider 49 provided on a stationary portion of the lens barrel. However, the vibrator 50 and its holding mechanism can be provided on a stationary portion, while the slider 49 and its holding mechanism can be provided on the second lens-holding member 43. Similarly, the second vibratory linear actuator 94 is not limited to the above-described arrangement. The slider 59 and its holding mechanism can be provided on a stationary portion, while the vibrator 60 and its holding mechanism can be provided on the fourth lens-holding member 48.

In the present exemplary embodiment, the first and second vibratory linear actuators 92 and 94 are the type that generates the pressing force using the magnet involved in the slider (49, 59). However, the first and second vibratory linear actuators 92 and 94 can be configured to include a spring member or other elastic member that can generate a pressing force.

The present exemplary embodiment is not limited to an imaging apparatus integrated with a photographic lens. The present exemplary embodiment can be applied to an interchangeable lens detachable from an imaging apparatus body.

Furthermore, the vibration member or the contact member configured into an arc shape according to the present exemplary embodiment has a function of automatically adjusting the inclination occurring around the optical axis. Thus, the present exemplary embodiment requires no adjusting mechanism externally provided. The vibratory linear actuator can be downsized.

Furthermore, the present exemplary embodiment can set an appropriate radius of curvature that defines the arc shape. The present exemplary embodiment can prevent the vibration member and the contact member from being subjected to an excessively large press-contact force locally acting. The present exemplary embodiment can improve the durability of the vibratory linear actuator.

Second Exemplary Embodiment

Figure 15:
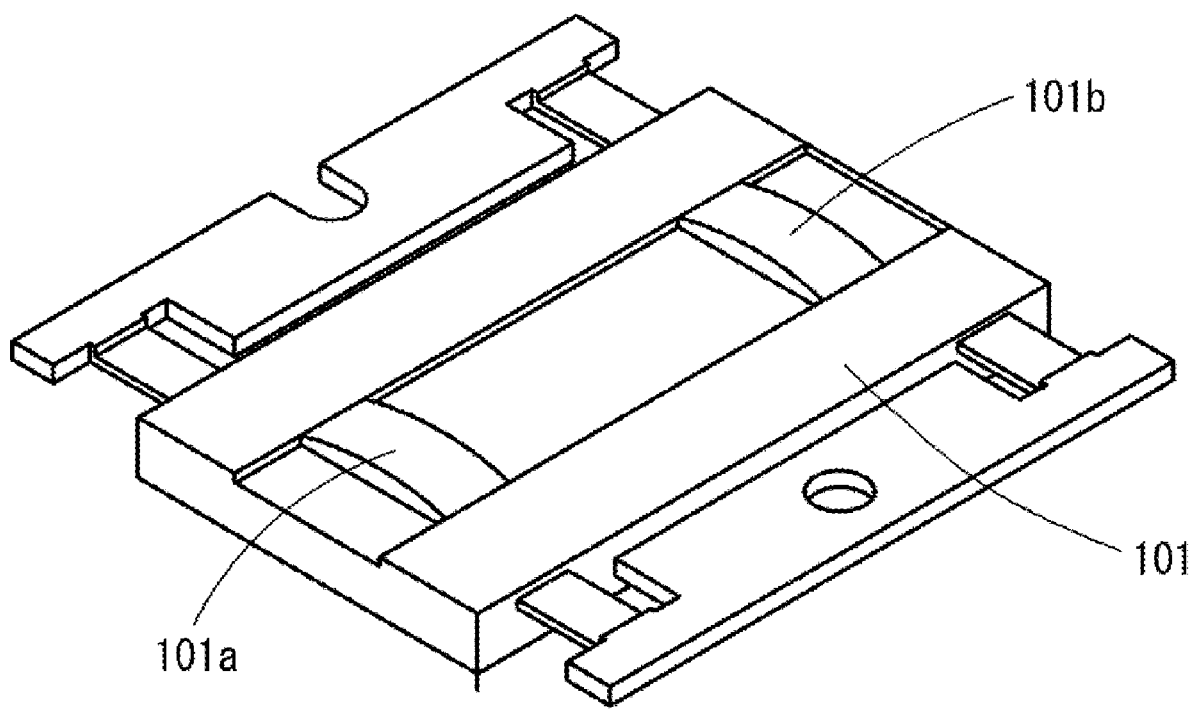
FIG. 15 is a perspective view of a vibrator according to a second exemplary embodiment of the present invention.
Figure 16:
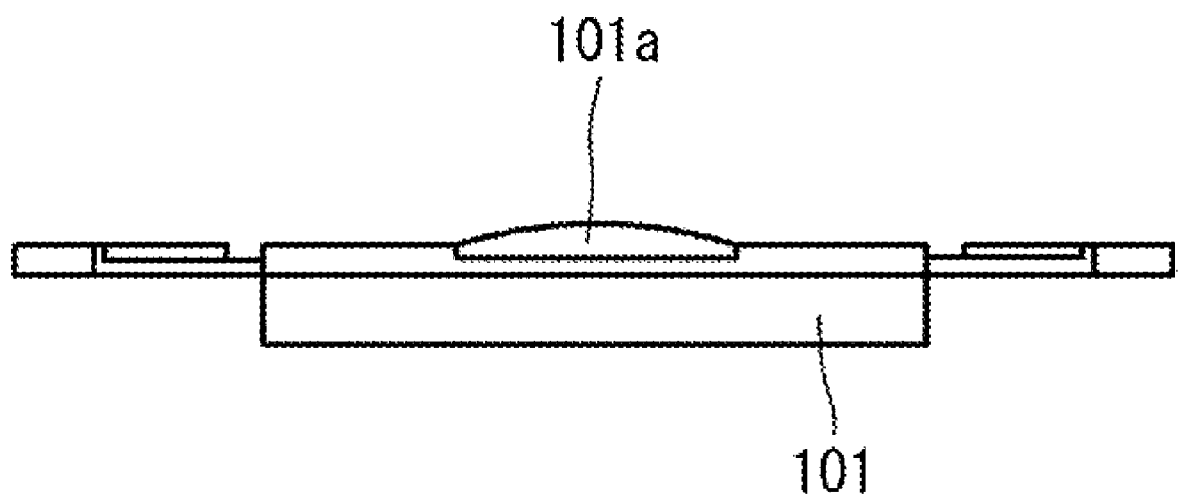
FIG. 16 is a front view of the vibrator illustrated in FIG. 15, which is seen from the optical-axis direction.
Figure 17:
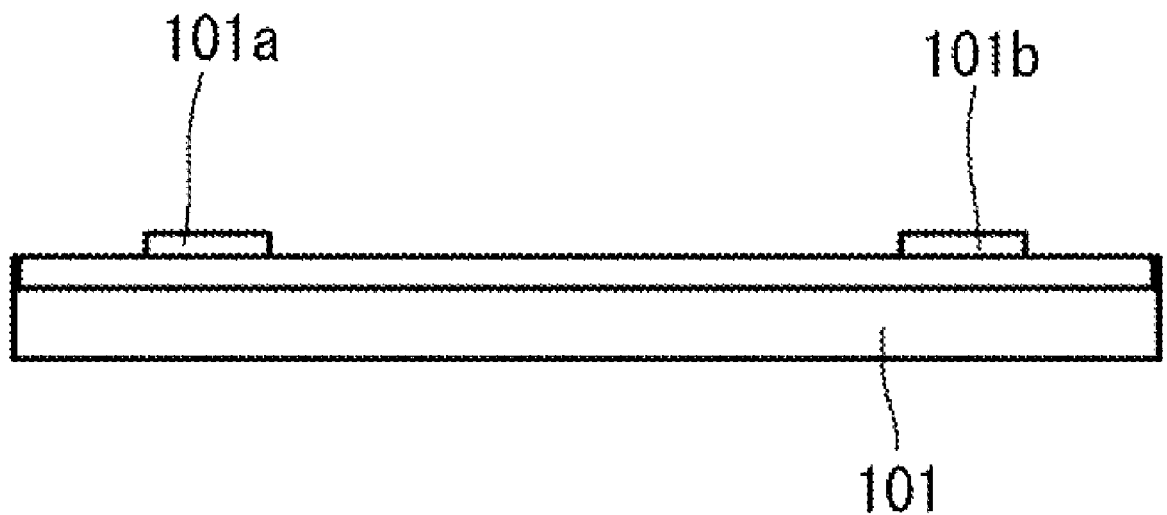
FIG. 17 is a side view of the vibrator illustrated in FIG. 15.

FIG. 15 is a perspective view of a vibrator according to a second exemplary embodiment of the present invention. FIG. 16 is a front view of the vibrator, which is seen from the optical-axis direction. FIG. 17 is a side view of the vibrator. The second exemplary embodiment is different from the first exemplary embodiment in that a press-contact surface of the slider is flat and a press-contact surface of the vibrator is configured into an arc shape. A vibrator 101 corresponds to the vibrator 50 described in the first exemplary embodiment. A slider 102 corresponds to the slider 49 described in the first exemplary embodiment. The remaining arrangement of the second exemplary embodiment is similar to that of the first exemplary embodiment. The vibrator 101 has two press-contact surfaces 101a and 101b respectively configured into an arc shape.

Figure 18:
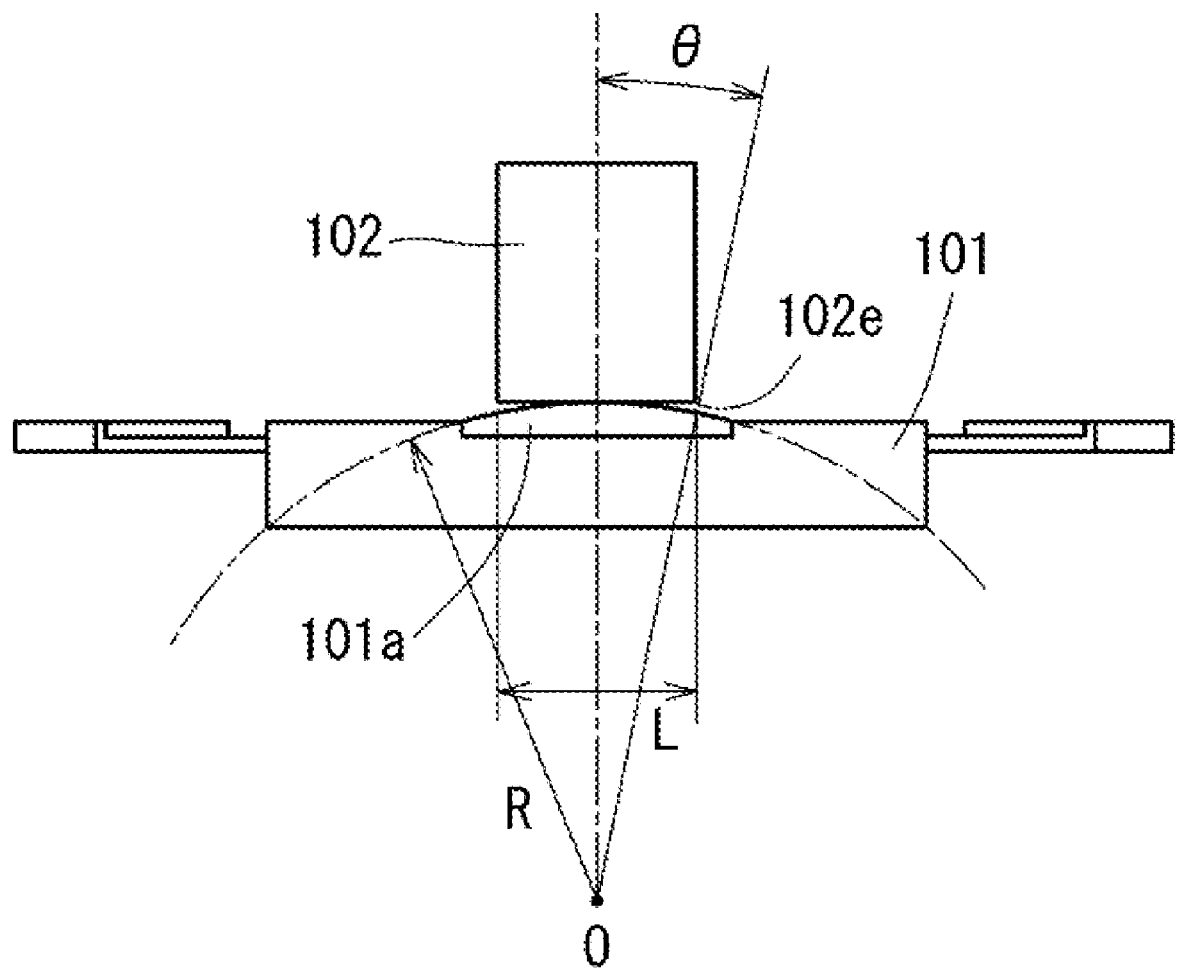
FIG. 18 is a front view illustrating a relationship between the slider and the vibrator seen from the optical-axis direction.
Figure 19:
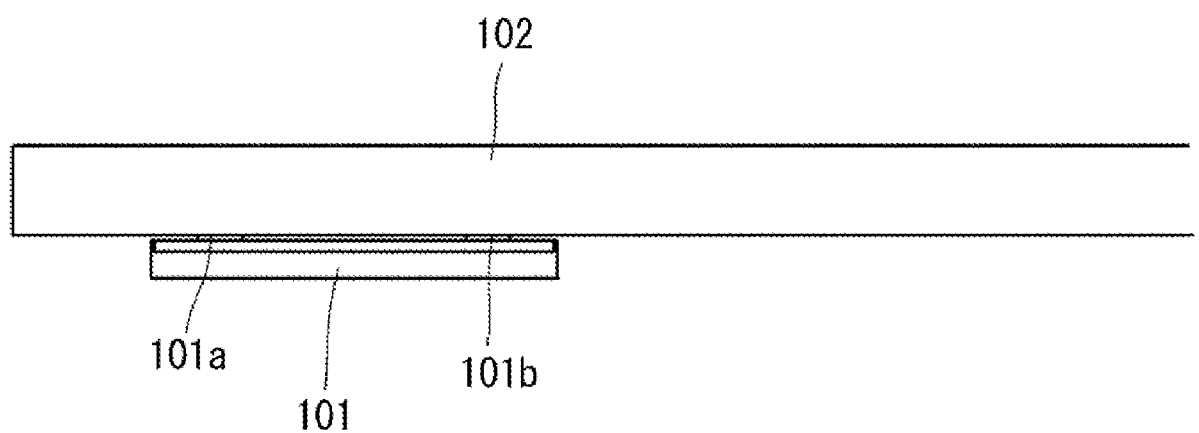
FIG. 19 is a side view of the slider and the vibrator illustrated in FIG. 18.

FIG. 18 is a front view illustrating a relationship between the slider 102 and the vibrator 101, seen from the optical-axis direction. FIG. 19 is a side view of the slider 102 and the vibrator 101. A flat press-contact surface of the slider 102 contacts the arc press-contact surfaces 101a and 101b of the vibrator 101. "R" represents a radius of curvature defining the arc shape of the press-contact surfaces 101a and 101b. "L" represents a width of a contact portion (i.e., press-contact surface) of the slider 102, defined on a surface perpendicular to an optical axis of the photographic lens. The angle θ is an angle formed between a line segment connecting the center O of the arc shape to a midpoint of the arc surface of the vibrator 101 and a line segment connecting the center of the arc shape to the edge 102e of the slider 102.

According to the second exemplary embodiment, if the relative inclination between the vibrator 101 and the slider 102 is less than the angle θ, the press-contact surface of the slider 102 can contact the press-contact surfaces 101a and 101b of the vibrator 101. Accordingly, the first vibratory linear actuator 92 can operate stably with performances expected. Thus, the second exemplary embodiment can obtain effects similar to those of the first exemplary embodiment.

Third Exemplary Embodiment

Figure 20:
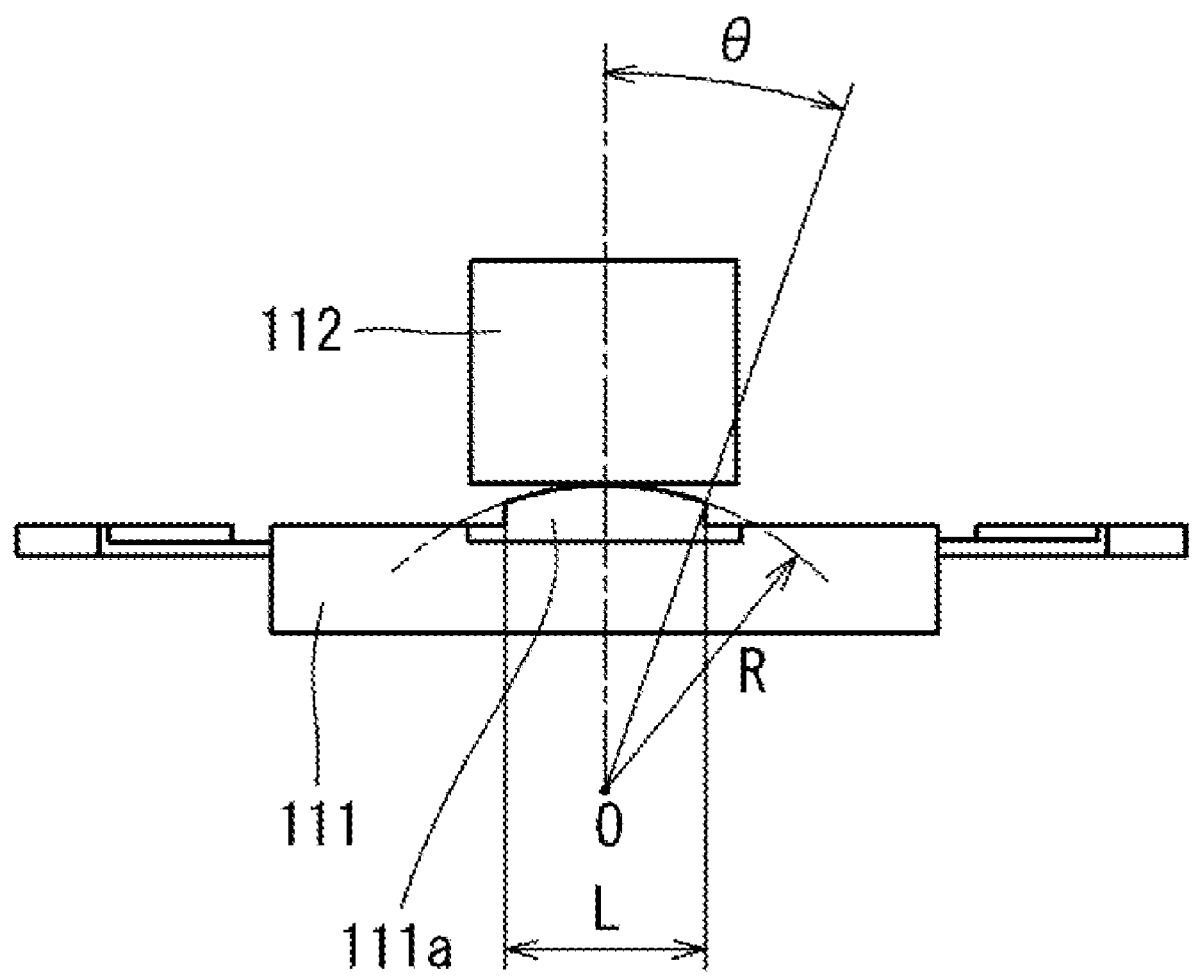
FIG. 20 is a front view illustrating a relationship between a slider and a vibrator according to a third exemplary embodiment of the present invention, which are seen from the optical-axis direction.
Figure 21:
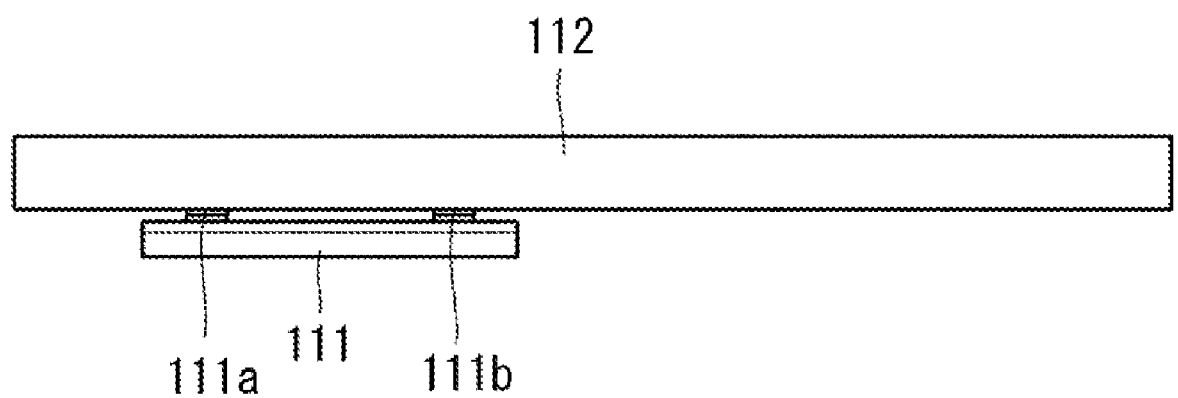
FIG. 21 is a side view of the slider and the vibrator illustrated in FIG. 20.

FIG. 20 is a front view illustrating a relationship between a slider 112 and a vibrator 111 according to a third exemplary embodiment of the present invention, seen from the optical-axis direction. FIG. 21 is a side view of the slider 112 and the vibrator 111. The vibrator 111 has two press-contact surfaces 111a and 111b respectively configured into an arc shape. The slider 112 has a flat press-contact surface. The third exemplary embodiment is different from the second exemplary embodiment in that the width L of the arc shape of the vibrator 111 is narrower than a width of the press-contact surface of the slider 112. The angle θ is an angle formed between a line segment connecting the center O of the arc shape of the vibrator 111 to a midpoint of the arc surface (111a, 111b) of the vibrator 111 and a line segment connecting the center of the arc shape to the edge of the arc surface of the vibrator 111.

According to the third exemplary embodiment, similar to the first exemplary embodiment, if the relative inclination between the slider 112 and the vibrator 111 is less than the angle θ, the press-contact surface of the slider 112 can contact the arc press-contact surfaces 111a and 111b of the vibrator 111. Accordingly, the first vibratory linear actuator 92 can operate stably with performances expected.

Fourth Exemplary Embodiment

Figure 22:
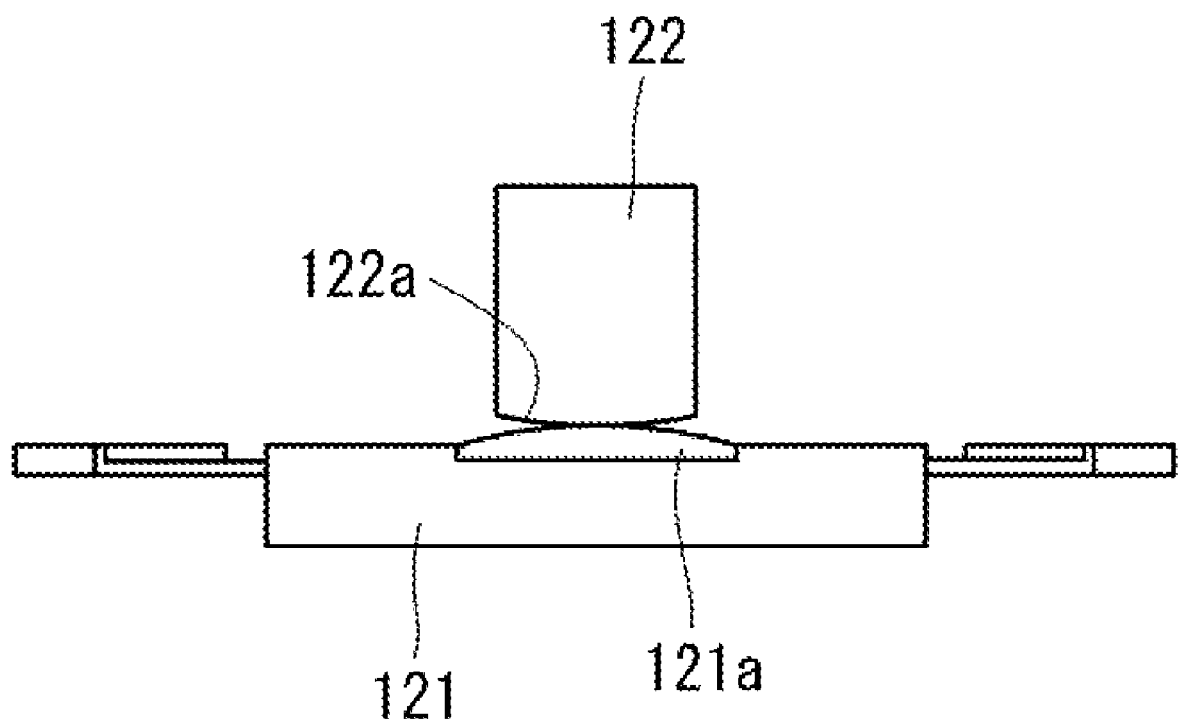
FIG. 22 is a front view illustrating a relationship between a slider and a vibrator according to a fourth exemplary embodiment of the present invention, which are seen from the optical-axis direction.
Figure 23:
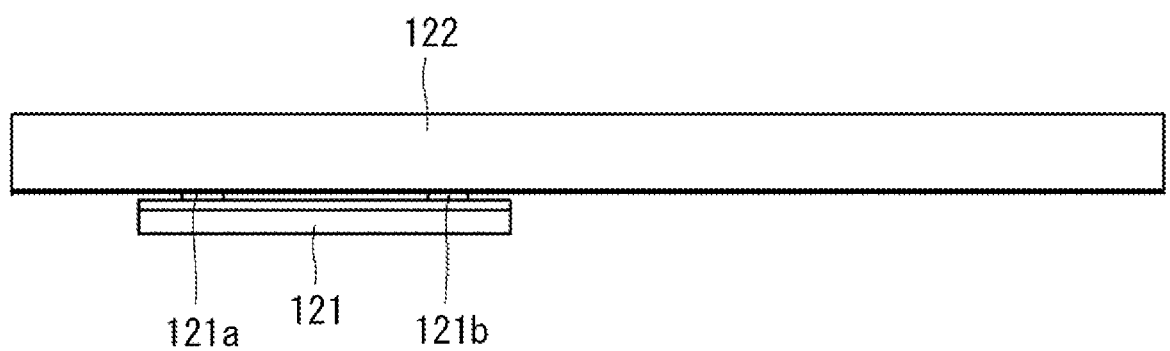
FIG. 23 is a side view of the slider and the vibrator illustrated in FIG. 22.
Figure 24A:
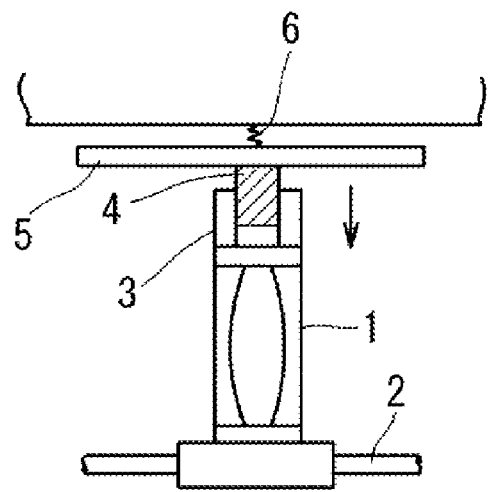
FIGS. 24A to 24D illustrate conventional vibratory linear actuators.
Figure 24B:
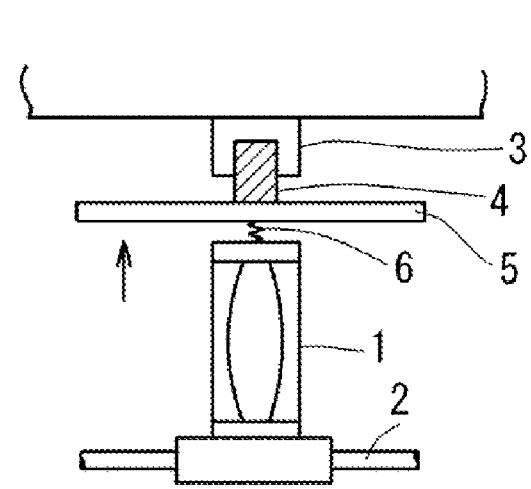
Figure 24C:
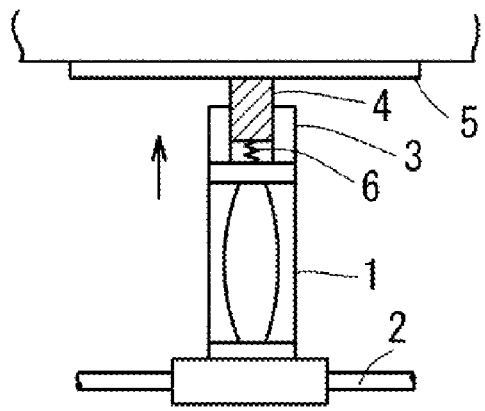
Figure 24D:
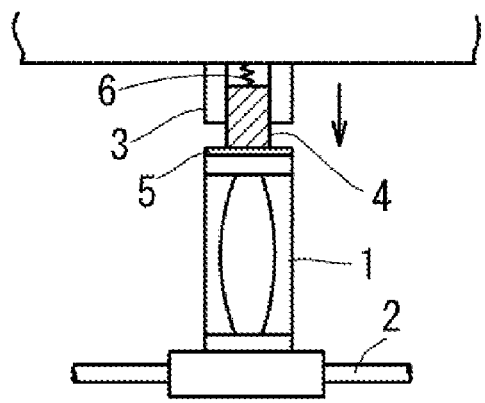
Figure 25:
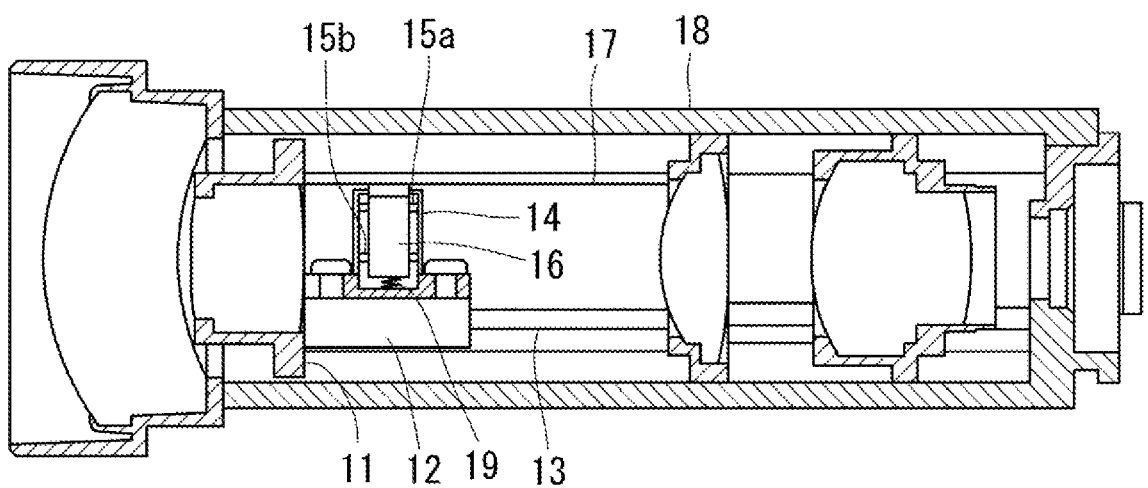
FIG. 25 illustrates a conventional lens barrel.
Figure 26A:
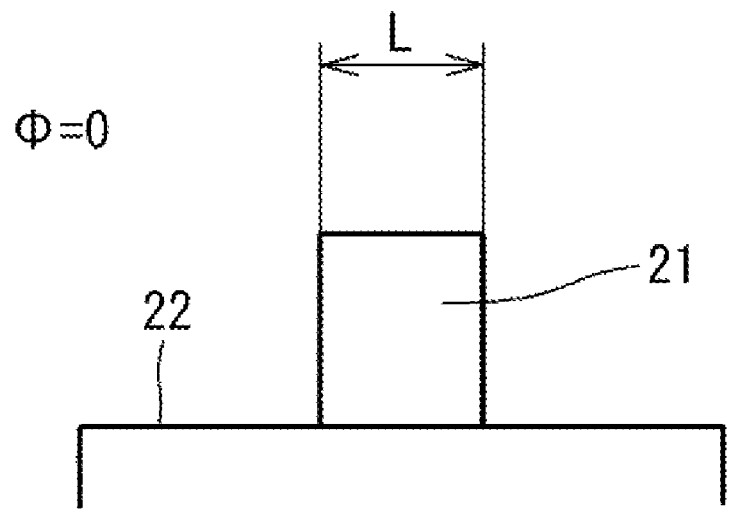
FIGS. 26A and 26B illustrate a relationship between a slider and a vibrator having flat pressure-receiving surfaces seen from the optical-axis direction according to a conventional vibratory linear actuator.
Figure 26B:
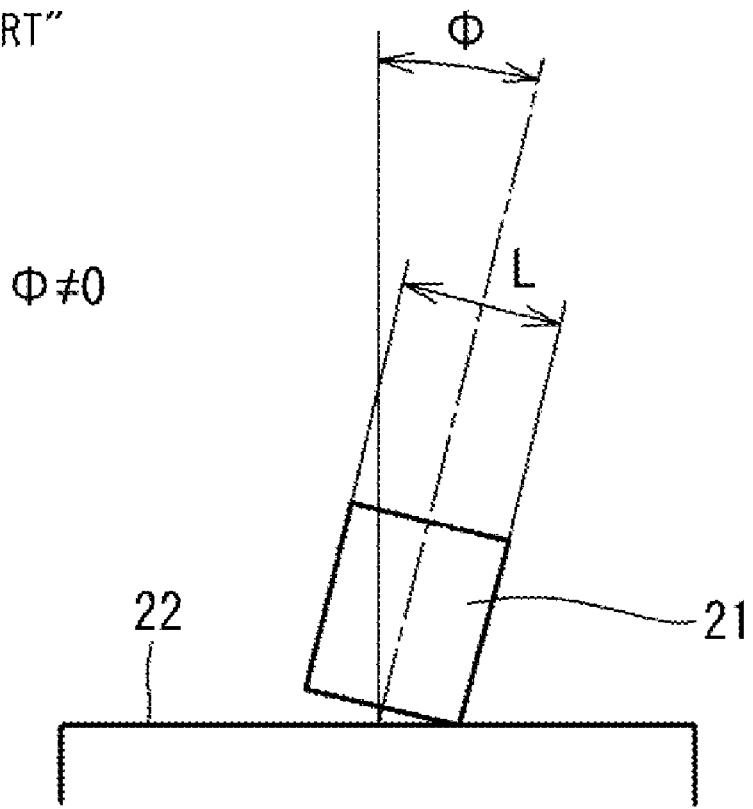

FIG. 22 is a front view illustrating a relationship between a slider 122 and a vibrator 121 according to a fourth exemplary embodiment of the present invention, seen from the optical-axis direction. FIG. 23 is a side view of the slider 122 and the vibrator 121 illustrated in FIG. 22. The vibrator 121 has press-contact surfaces 121a and 121b respectively configured into an arc shape. The slider 122 has a press-contact surface 122a configured into an arc shape.

According to the arrangement illustrated in FIGS. 22 and 23, if a relative inclination is caused between the slider 122 and the vibrator 121, the press-contact state between the slider 122 and the vibrator 121 does not change. A stable contact can be maintained between the arc shape of the slider 122 and the arc shape of the vibrator 121. The fourth exemplary embodiment allows a larger inclination between the slider 122 and the vibrator 121, because the press-contact surfaces of the slider 122 and the vibrator 121 are respectively configured into an arc shape.

As described above, if a relative inclination around an optical axis occurs between a vibration member and a contact member, the exemplary embodiments of the present invention can eliminate or reduce a change in the press-contact state between the vibration member and the contact member and can maintain the press-contact state adequately to constantly obtain a sufficient driving force. Accordingly, the vibratory linear actuator can operate stably with performances expected.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-255469 filed Sep. 21, 2006, which is hereby incorporated by reference herein in its entirety.

What is claimed is:

1. An optical apparatus comprising:
    a photographic lens; and
    a vibratory actuator configured to move the photographic lens,
    wherein the vibratory actuator comprises:
        a vibration member configured to electro-mechanically convert energy to generate vibrations; and
        a contact member contacting the vibration member,
    wherein at least one press-contact surface of the vibration member and the contact member has an arc shape having a central axis corresponding to a moving direction of the photographic lens, and
    wherein a relationship $0.5 \leq R/L \leq 10$ is satisfied when (L) represents a width of the press-contact surface defined on a surface perpendicular to an optical axis of the photographic lens and (R) represents a radius of curvature of the arc share of the press-contact surface.

2. The optical apparatus according to claim 1, wherein one of the vibration member and the contact member is a magnet and the other is a ferromagnetic material.

* * * * *